(12) United States Patent
Hessling-Von Heimendahl et al.

(10) Patent No.: US 11,136,139 B2
(45) Date of Patent: Oct. 5, 2021

(54) AIRCRAFT LIGHT FOR A FOLDABLE WING TIP OF AN AIRCRAFT, AIRCRAFT, AND METHOD OF OPERATING AN AIRCRAFT LIGHT ARRANGED ON A FOLDABLE WING TIP OF AN AIRCRAFT

(71) Applicant: Goodrich Lighting Systems GmbH, Lippstadt (DE)

(72) Inventors: Andre Hessling-Von Heimendahl, Koblenz (DE); Anil Kumar Jha, Lippstadt (DE); Marion Depta, Lippstadt (DE); Norbert Menne, Paderborn (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/564,177

(22) Filed: Sep. 9, 2019

(65) Prior Publication Data
US 2020/0094987 A1    Mar. 26, 2020

(30) Foreign Application Priority Data

Sep. 21, 2018  (EP) .................................... 18196035

(51) Int. Cl.
*B64D 47/06* (2006.01)
*F21S 43/14* (2018.01)
(Continued)

(52) U.S. Cl.
CPC ................ *B64D 47/06* (2013.01); *B64C 3/56* (2013.01); *F21S 43/14* (2018.01);
(Continued)

(58) Field of Classification Search
CPC ...... B64D 47/06; B64D 2203/00; B64C 3/56; F21S 43/14; F21V 23/0407; F21V 23/0492
See application file for complete search history.

(56) References Cited

U.S. PATENT DOCUMENTS

| 2,375,075 A | * | 5/1945 | Carruth | ................. | B64D 47/06 362/470 |
| 2,571,158 A | * | 10/1951 | Orlansky | ............... | B64D 47/06 362/470 |

(Continued)

FOREIGN PATENT DOCUMENTS

GB        2377986 A       1/2003

OTHER PUBLICATIONS

Extended European Search Report for International Application No. 18196035.2 dated Feb. 12, 2019, 6 pages.

*Primary Examiner* — Arman B Fallahkhair
(74) *Attorney, Agent, or Firm* — Cantor Colburn LLP

(57) ABSTRACT

An aircraft light for a foldable wing tip of an aircraft includes a first lighting structure, including at least one first light source and a first optical system, with the at least one first light source and the first optical system in operation generating a first light output; a second lighting structure, including at least one second light source and a second optical system, with the at least one second light source and the second optical system in operation generating a second light output; wherein the first light output and the second light output are of the same color and wherein the first light output and the second light output are angled with respect to each other; and wherein the aircraft light is configured to control the at least one first light source and the at least one second light source depending on a wing tip orientation signal, which is indicative of an orientation of the foldable wing tip.

19 Claims, 13 Drawing Sheets

(51) Int. Cl.
  *B64C 3/56* (2006.01)
  *F21V 23/04* (2006.01)
  *F21Y 113/13* (2016.01)
  *F21Y 115/10* (2016.01)
  *F21W 103/10* (2018.01)
  *F21W 107/30* (2018.01)

(52) U.S. Cl.
  CPC ...... *F21V 23/0407* (2013.01); *F21V 23/0492* (2013.01); *B64D 2203/00* (2013.01); *F21W 2103/10* (2018.01); *F21W 2107/30* (2018.01); *F21Y 2113/13* (2016.08); *F21Y 2115/10* (2016.08)

(56) References Cited

U.S. PATENT DOCUMENTS

| | | | |
|---|---|---|---|
| 8,894,255 B1 * | 11/2014 | Kimball | A63H 27/02 |
| | | | 362/459 |
| 9,296,471 B2 * | 3/2016 | Sakurai | B64C 3/40 |
| 9,517,834 B2 | 12/2016 | Thompson | |
| 9,950,811 B2 | 4/2018 | Seibt | |
| 2009/0182506 A1 | 7/2009 | Yun | |
| 2016/0090170 A1 * | 3/2016 | Thompson | B64C 3/56 |
| | | | 701/3 |
| 2016/0280396 A1 * | 9/2016 | Schoen | B64D 47/06 |
| 2017/0233100 A1 * | 8/2017 | Gagnon | B64D 47/04 |
| | | | 362/470 |
| 2019/0300201 A1 * | 10/2019 | Edwards | B64D 47/06 |
| 2020/0094988 A1 * | 3/2020 | Hessling-Von Heimendahl | |
| | | | B64D 47/06 |
| 2020/0122857 A1 * | 4/2020 | Jha | B64C 23/072 |

* cited by examiner

AIRCRAFT LIGHT FOR A FOLDABLE WING TIP OF AN AIRCRAFT, AIRCRAFT, AND METHOD OF OPERATING AN AIRCRAFT LIGHT ARRANGED ON A FOLDABLE WING TIP OF AN AIRCRAFT

FOREIGN PRIORITY

This application claims priority to European Patent Application No. 18196035.2 filed Sep. 21, 2018, the entire contents of which is incorporated herein by reference.

TECHNICAL FIELD

The present invention relates to exterior aircraft lighting. In particular, it relates to an aircraft light and to a method of operating an aircraft light. Further in particular, it relates to an aircraft navigation light and to a method of operating an aircraft navigation light.

BACKGROUND

Almost all aircraft are equipped with exterior lighting systems. For example, large commercial aircraft have many different exterior lights. An exemplary group of exterior aircraft lights are lights for passive visibility, such as navigation lights, anti-collision lights, and logo lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights.

Modern air planes are made in various different models. Existing exterior aircraft lights do not fit all of these models in all operating regimes in an entirely satisfactory manner. Accordingly, it would be beneficial to provide exterior aircraft lights that fit well with various different air plane designs. In particular, it would be beneficial to provide an aircraft light that works well with various air plane models and/or different operating regimes. It would further be beneficial to provide an aircraft equipped with such an aircraft light. Yet further, it would be beneficial to provide a method of operating such an aircraft light.

SUMMARY

Exemplary embodiments of the invention include an aircraft light for a foldable wing tip of an aircraft, comprising a first lighting structure, comprising at least one first light source and a first optical system, with the at least one first light source and the first optical system in operation generating a first light output; a second lighting structure, comprising at least one second light source and a second optical system, with the at least one second light source and the second optical system in operation generating a second light output; wherein the first light output and the second light output are of the same color and wherein the first light output and the second light output are angled with respect to each other; and wherein the aircraft light is configured to control the at least one first light source and the at least one second light source depending on a wing tip orientation signal, which is indicative of an orientation of the foldable wing tip.

The aircraft light is an exterior aircraft light. In particular embodiments, the aircraft light is an aircraft navigation light, and the first light output is a first navigation light output and the second light output is a second navigation light output.

Exemplary embodiments of the invention allow for the provision of an aircraft navigation light that is able to provide a well-suited navigation light output, both when the foldable wing tip of the aircraft is in a folded up position and when the foldable wing tip is in a laterally extended position. In this way, it is made possible to fold up the wing tips of an aircraft model having foldable wing tips during taxiing on an airport, without compromising the signalling safety provided by navigation lights. As compared to previous approaches, where the aircraft navigation lights in the wing tips of an aircraft only had one navigation light output, which navigation light output was directed upwardly upon bringing the wing tips in a folded up position, exemplary embodiments of the invention may provide for lateral emission of a navigation light output, even when the wing tips are folded up. In addition to folding up the wing tips in an aircraft's parking position, which may be done for saving space on airports, the wing tips of an aircraft equipped with aircraft navigation lights in accordance with exemplary embodiments of the invention may be folded up during taxiing without compromising safety. In this way, the space requirements for taxiing may be reduced, while still emitting reliable signalling in the form of a suitable navigation light output.

The aircraft navigation light may be referred to as a wing tip aircraft navigation light. The aircraft navigation light in accordance with exemplary embodiments of the invention is configured for being arranged in a foldable wing tip. In particular, the aircraft navigation light may have a size, weight, and design that fits into a foldable wing tip of an aircraft. The aircraft navigation light may have a lens cover that blends into the aerodynamic contour of the foldable wing tip.

The aircraft navigation light may be configured to control the at least one first light source and the at least one second light source depending on the wing tip orientation signal. In particular, the aircraft navigation light may have a control unit that is configured to receive the wing tip orientation signal and that is configured to control the at least one first light source and the at least one second light source depending on the wing tip orientation signal. The wing tip orientation signal may be generated within the aircraft navigation light or may be received from outside of the aircraft navigation light or may be combined from information generated within the aircraft navigation light and information received from outside of the aircraft navigation light, as will be described in detail below.

The at least one first light source and the first optical system may be arranged to cooperate for generating the first navigation light output in operation. Analogously, the at least one second light source and the second optical system may be arranged to cooperate for generating the second navigation light output in operation. The first navigation light output and the second navigation light output independently satisfy the desired light intensity requirements of the aircraft navigation light, such as the light intensity requirements as laid out in the Federal Aviation Regulations (FAR), in particular in sections 25.1385 to 25.1397 of the FAR. In other words, when oriented laterally outwards from the foldable wing tip of the aircraft, each of the first navigation light output and the second navigation light output may provide for the desired navigation lighting intensities. The terms aircraft navigation light and aircraft position light may be used interchangeably in accordance with their synonymous usage in the field of exterior aircraft lighting.

The first navigation light output and the second navigation light output may be of the same color. It is possible that both the at least one first light source and the at least one second light source are light sources of the same color, such as light sources of green color or light sources of red color, for example green LEDs or red LEDs. It is also possible that the at least one first light source and the at least one second light source are white light sources, such as white LEDs, and that the first optical system and the second optical system have corresponding color filters, i.e. color filters for achieving the same color in the first navigation light output and the second navigation light output. The term same color refers to the same nominal color for the first navigation light output and the second navigation light output. Color differences may occur due to manufacturing tolerances, wear of the light sources, lens degradation, etc. Also, the term same color does not refer to the same spectral color. Rather, the same color refers to the first navigation light output and the second navigation light output being in the same predefined color range. In particular, the term same color means that both the first navigation light output and the second navigation light output are of a green color or that both the first navigation light output and the second navigation light output are of a red color. The terms green and red may refer to the color ranges of aviation green and aviation red, as defined in the Federal Aviation Regulations (FAR).

The at least one first light source may be exactly one first light source. The at least one first light source may also be a plurality of first light sources, such as two or three or four first light sources. The plurality of first light sources may be provided for redundancy purposes or may be provided for sharing the load in achieving a desired light intensity between the plurality of first light sources.

The at least one second light source may be exactly one second light source. The at least one second light source may also be a plurality of second light sources, such as two or three or four second light sources. The plurality of second light sources may be provided for redundancy purposes or may be provided for sharing the load in achieving a desired light intensity between the plurality of second light sources.

The at least one first light source may be at least one first LED. The at least one second light source may be at least one second LED.

The wing tip orientation signal is indicative of the orientation of the foldable wing tip. In particular, the wing tip orientation signal may convey information differentiating between a folded up position of the foldable wing tip and a laterally extended position of the foldable wing tip. The wing tip orientation signal may convey information differentiating between a substantially vertical position of the foldable wing tip and a substantially horizontal position of the foldable wing tip. The wing tip orientation signal may also be more granular. For example, it may convey three potential states namely a folded up position, a laterally extended position, and an intermediate position. The wing tip orientation signal may be even more granular and covey information about the rotation angle of the foldable wing tip. Yet further, the wing tip orientation signal may also convey both a state of rotation of the foldable wing tip and an information about whether the foldable wing tip is oriented to be a left foldable wing tip or oriented to be a right foldable wing tip. These different kinds of information may be combined in a unitary signal or may be split up into different sub-signals, as will be explained below.

In particular embodiments, the aircraft light is an aircraft logo light, and the first light output is a first logo light output and the second light output is a second logo light output. The first logo light output and the second logo light output may be of white color. Logo lights may be installed in wing tips of aircraft and may be configured for illuminating the vertical stabilizer of the aircraft. As the vertical stabilizer often carries an airline logo, such lights are often referred to as logo lights. When installed in the wing tip, the aircraft logo light may be directed inboard in the aircraft frame of reference. The illumination of the vertical stabilizer may enhance safety in two ways. First, the illumination of the vertical stabilizer may help in checking the vertical stabilizer on the airfield before flight. Second, the illumination of the vertical stabilizer provides a good indication of the tail of the aircraft, thus signalling the extension of the aircraft in question. By providing two logo light outputs and by selecting an appropriate one of the two logo light outputs depending on the wing tip orientation signal, good illumination of the vertical stabilizer may be achieved for different orientations of the foldable wing tip. Above considerations regarding the aircraft light being an aircraft navigation light apply to the aircraft logo light in an analogous manner.

According to a further embodiment, the aircraft light is configured to turn on the at least one first light source, when the wing tip orientation signal indicates a folded up position of the foldable wing tip. Further, the aircraft light may be configured to turn off the at least one second light source, when the wing tip orientation signal indicates a folded up position of the foldable wing tip. In particular, it may be the control unit of the aircraft light that turns on the at least one first light source and turns off the at least one second light source, if applicable. The feature of the aircraft light being configured to turn on the at least one first light source does not necessarily imply that the at least one first light source is switched from an off state to an on state. Rather, it means that power is supplied to the at least one first light source for effecting illumination thereof, when the wing tip orientation signal indicates a folded up position of the foldable wing tip. A stationary state of perceived continuous illumination is meant by the term turned on. The aircraft light may be configured to turn on the at least one first light source, when the wing tip orientation signal indicates a fully folded up position of the foldable wing tip. It is also possible that the aircraft light is configured to turn on the at least one first light source, when the wing tip orientation indicates that the rotation of the foldable wing tip is above a predetermined angle threshold. It is also possible that a filtering of the wing tip orientation signal takes place. For example, the aircraft light may be configured to turn on the at least one first light source, when the wing tip orientation signal indicates a folded up position of the foldable wing tip for a predetermined time period.

According to a further embodiment, the aircraft light is configured to turn on the at least one second light source, when the wing tip orientation signal indicates a laterally extended position of the foldable wing tip. Further, the aircraft light is configured to turn off the at least one first light source, when the wing tip orientation signal indicates a laterally extended position of the foldable wing tip. In particular, it may be the control unit of the aircraft light that turns on the at least one second light source and turns off the at least one first light source. The feature of the aircraft light being configured to turn on the at least one second light source does not necessarily imply that the at least one second light source is switched from an off state to an on state. Rather, it means that power is supplied to the at least one second light source for effecting illumination thereof, when the wing tip orientation signal indicates a laterally extended position of the foldable wing tip. A stationary state of perceived continuous illumination is meant by the term turned on. The aircraft light may be configured to turn on the at least one second light source, when the wing tip orientation signal indicates a fully laterally extended position of the foldable wing tip. It is also possible that the aircraft light is configured to turn on the at least one second light source, when the wing tip orientation indicates that the rotation of the foldable wing tip is below a predetermined angle threshold. It is also possible that a filtering of the wing tip orientation signal takes place. For example, the aircraft light may be configured to turn on the at least one second light source, when the wing tip orientation signal indicates a laterally extended position of the foldable wing tip for a predetermined time period.

According to a further embodiment, the aircraft light is configured to operate the at least one first light source and/or the at least one second light source in a flashing manner, when the wing tip orientation signal indicates a movement of the foldable wing tip between a folded up position and a laterally extended position. In particular, the aircraft light may be configured to operate both the at least one first light source and the at least one second light source in a flashing manner when the wing tip orientation signal indicates a movement of the foldable wing tip between a folded up position and a laterally extended position. Further, the aircraft light may be configured to operate the at least one first light source and/or the at least one second light source in a flashing manner for both moving directions, i.e. both for a movement of the foldable wing tip from a folded up position to a laterally extended position and for a movement from the laterally extended position to the folded up position. In this way, the aircraft light may be used for the additional safety feature of signalling the movement of the foldable wing tip. Accordingly, a change in geometry of the wing of the aircraft, which may be problematic due to the altered wing span of the aircraft, may be signalled to the observers of the aircraft, such as ground personnel on an airport, in a beneficial manner. The term flashing refers to a flashing effect perceived by an observer of the aircraft. The aircraft light may further be configured to safely detect the movement of the foldable wing tip. For example, a low pass may be applied to the wing tip orientation signal, in order to distinguish the movement of the foldable wing tip between the folded up position and the laterally extended position from vibrations in the wing. Also, it is possible that the flashing light output is only generated if the movement of the foldable wing lasts longer than a predetermined time period.

According to a further embodiment, the aircraft light is an aircraft navigation light and the color of the first navigation light output and the second navigation light output is one of green and red. In other words, both the color of the first light output and the color of the second light output is either green or red. In this way, the aircraft navigation light may be well-suited for operating as a right wing tip navigation light or as a left wing tip navigation light, respectively.

According to a further embodiment, the first light output and the second light output are angled between 60° and 120° with respect to each other. In particular, the first light output and the second light output may be angled between 75° and 105° with respect to each other. Further in particular, the first light output and the second light output may be angled about 90° with respect to each other. Above angles may be defined between the planes of peak light intensity of the first light output and the second light output. In accordance with the FAR requirements for navigation lights, the plane of peak light intensity is in or close to the horizontal plane in the aircraft frame of reference. The first light output and the second light output may be angled with respect to each other in multiple dimensions in a Cartesian coordinate system. Above value ranges refer to the angle between the first light output and the second light output in that dimension of the Cartesian coordinate system where the angle between the first and second light outputs is largest. The Cartesian coordinate system may be defined as an x-y-z coordinate system in the aircraft frame of reference, with the x-axis corresponding to the longitudinal axis of the aircraft and the z-axis corresponding to the vertical direction.

According to a further embodiment, the first light output and the second light output are angled with respect to each other corresponding to a folding angle of the foldable wing tip of the aircraft between the folded up position and the laterally extended position. In this way, the aircraft light might provide for very similar or substantially the same light output for both the folded up position and the laterally extended position of the foldable wing tip.

According to a further embodiment, the aircraft light comprises an orientation sensor, configured to detect an orientation of the aircraft light and to provide the wing tip orientation signal. With the aircraft light in operation being arranged in the foldable wing tip of the aircraft, the orientation sensor may detect the orientation of the foldable wing tip by detecting the orientation of the aircraft light and may, thus, reliably provide the wing tip orientation signal indicative of the orientation of the foldable wing tip. With the help of the orientation sensor, an autonomous selection between the first light output and the second light output without external control information may be achieved.

According to a further embodiment, the orientation sensor is an inertial sensor. In particular, the orientation sensor may be an accelerometer. The orientation sensor may use the gravitational forces of the earth to determine which orientation the aircraft navigation light has.

According to a further embodiment, the aircraft light comprises an orientation signal input for receiving the wing tip orientation signal from outside of the aircraft light. The wing tip orientation signal may be received from an aircraft board computer or from a pilot wing tip controller or from any other suitable entity within the aircraft that has information about the orientation of the foldable wing tip. In this way, information available in another entity of the aircraft, may be re-used for the wing tip orientation signal.

According to a further embodiment, the aircraft light comprises an orientation sensor configured to detect an orientation of the aircraft light and to provide the wing tip orientation signal, and the aircraft light comprises an additional control input for receiving an additional control signal from outside of the aircraft light. Such additional control signal may for example contain override commands with respect to the wing tip orientation signal generated by the orientation sensor. It may also contain additional control commands, such as dimming commands for operation in a parking position.

According to a further embodiment, the aircraft light is an aircraft navigation light; the first light output is a first navigation light output and the second light output is a second navigation light output; the first lighting structure comprises at least one third light source, with the at least one third light source and the first optical system in operation generating a third navigation light output; the second lighting structure comprises at least one fourth light source, with the at least one fourth light source and the second optical system in operation generating a fourth navigation light output; the third navigation light output and the fourth navigation light output are of the same color; the color of the first navigation light output and the second navigation light output is one of green and red and the color of the third navigation light output and the fourth navigation light output is the other one of green and red; and the aircraft light is configured to control the at least one first light source, the at least one second light source, the at least one third light source, and the at least one fourth light source depending on the wing tip orientation signal. The at least one third light source may be arranged adjacent to the at least one first light source. Analogously, the at least one fourth light source may be arranged adjacent to the at least one second light source. Such an aircraft navigation light, having two red navigation light outputs and two green navigation light outputs, may be employed both as the right wing tip navigation light and as the left wing tip navigation light and may provide for suitable navigation light functionality in the folded up position of the wing tip and the laterally extended position of the wing tip on both sides. In this way, only one kind of wing tip navigation light is sufficient for equipping both wings, thus keeping manufacturing complexity low, keeping storage space low, and/or keeping the risk of assembly errors low.

According to a further embodiment, the color of the first navigation light output and the second navigation light output is green and the color of the third navigation light output and the fourth navigation light output is red, wherein the aircraft light is configured to turn on the at least one first light source, when the wing tip orientation signal indicates a folded up position of a right foldable wing tip, wherein the aircraft light is configured to turn on the at least one second light source, when the wing tip orientation signal indicates a laterally extended position of the right foldable wing tip, wherein the aircraft light is configured to turn on the at least one fourth light source, when the wing tip orientation signal indicates a folded up position of a left foldable wing tip, and wherein the aircraft light is configured to turn on the at least one third light source, when the wing tip orientation signal indicates a laterally extended position of the left foldable wing tip. The aircraft light may further be configured to turn on either the at least one first light source or the at least one second light source or the at least one third light source of the at least one fourth light source and to turn off the respective other light sources in the operating situations stated above.

The aircraft navigation light may extract two pieces of information from the wing tip orientation signal, namely whether the wing tip, to which the aircraft navigation light is mounted, is the wing tip of a right wing or of a left wing and whether the wing tip is in a folded up position or in a laterally extended position. The aircraft navigation light may thus reliably provide a suitable navigation light output, both when used as a right wing tip navigation light and when used as a left wing tip navigation light. The two pieces of information may be jointly provided in a single signal. For example, the wing tip orientation signal may be an angular signal on a 360° scale, from which both the orientation as a right wing tip navigation light or left wing tip navigation light and the orientation in the folded up position or the laterally extended position of the wing tip are deducible. It is also possible that the two pieces of information are contained partly explicitly and partly implicitly in the wing tip orientation signal. For example, when the wing tip orientation signal is received from outside of the aircraft navigation light, the pure presence of the wing tip orientation signal may imply if a green navigation light output or a red navigation light output is desired, e.g. when the aircraft navigation light has two orientation signal inputs for green and red operation. The differentiation between the folded up position and the laterally extended position may then be encoded in the value of the wing tip orientation signal. It is also possible that the two pieces of information are split up between two wing tip orientation sub-signals. For example, a first wing tip orientation sub-signal, received from outside of the aircraft navigation light, may indicate if the aircraft navigation light is a right wing tip navigation light or a left wing tip navigation light. This first wing tip orientation sub-signal may for example be implied in the particular connection of the aircraft navigation light used for coupling it to the on-board electricity distribution network. A second wing tip orientation sub-signal may indicate the folded up position vs. the laterally extended position of the wing tip. The second wing tip orientation sub-signal may be provided by an orientation sensor in the aircraft navigation light, by a sensor sensing the operation of the folding actuators of the foldable wing tip, by a pilot control command for the folding of the foldable wing tip, etc.

According to a further embodiment, the aircraft light is configured to operate the at least one first light source and the at least one third light source and/or the at least one second light source and the at least one fourth light source in a flashing manner, when the wing tip orientation signal indicates a movement of the foldable wing tip between a folded up position and a laterally extended position. By effecting red and green light output at the same time, the color mixing may result in the output of orange/orangish/yellowish light. Accordingly, an orange or similar blinking effect may be achieved for indicating the movement of the foldable wing tip between the folded up position and the laterally extended position. The orange blinking effect provides for a particularly effective indication or warning that the wing tips are being moved. Observers of the aircraft, such as ground personnel on the airport, tend to pay great attention to an orange blinking warning signal. This warning signal may be provided with the red and green navigation light outputs without requiring additional light source(s). It is possible that the aircraft navigation light is configured to operate all of the at least one first light source, the at least one third light source, the at least one second light source, and the at least one fourth light source in a flashing manner, when the wing tip orientation signal indicates a movement of the foldable wing tip between a folded up position and a laterally extended position. In this way, an orange/orangish/yellowish blinking effect in various directions can be achieved. When effecting the color mixing between red and green, the light sources in question can be operated in a dimmed manner. In this way, the power consumption of the aircraft navigation light in this flashing mode can be kept comparable to the power consumption during emission of the red or green navigation light output only. In this way, no particular strain on the aircraft on-board electricity distribution network and/or no increased power handling capacities on the part of the aircraft navigation light have to be provided for implementing the blinking light output. Dimming may be achieved via pulse width modulation or a reduction of current to the light sources or in any other suitable manner.

According to a further embodiment, the aircraft light is configured to operate the at least one first light source and the at least one third light source and/or the at least one second light source and the at least one fourth light source with a continuous light output in response to an aircraft parking signal. By jointly providing a green navigation light output and a red navigation light output, the color mixing may result in the output of orange/orangish/yellowish light.

Depending on the shades of red light and green light and the relative dimming levels, a suitable color light output for signalling the parked aircraft may be achieved. For example, a continuous emission of yellow/yellowish light may provide for an effective indication of the parked state of the aircraft. Due to the aircraft navigation light being provided in the wing tip, the emission of light in accordance with such a parking mode operation allows for an effective signalling of the lateral extension of the aircraft at night. In this way, the risk of aircraft/aircraft collisions and/or collisions between ground vehicles and parked aircraft can be reduced. The light intensity of the aircraft navigation light in the parking mode operation may be lower than in the standard navigation light operation. The aircraft parking signal may for example be received from the aircraft board computer or from an according pilot control switch. It may also be deduced from another control command, such as from an engine power down command.

Exemplary embodiments of the invention further include an aircraft comprising a fuselage; a right wing, comprising a right main wing portion and a right foldable wing tip, wherein the right foldable wing tip is rotatable with respect to the right main wing portion; a left wing, comprising a left main wing portion and a left foldable wing tip, wherein the left foldable wing tip is rotatable with respect to the left main wing portion; a right aircraft light, arranged in the right foldable wing tip; and a left aircraft light, arranged in the left foldable wing tip; wherein each of the right aircraft light and the left aircraft light are in accordance with any of the embodiments described above. The aircraft may be an air plane or a helicopter. The modifications, additional features, and beneficial effects, described above with respect to the aircraft navigation light, apply to the aircraft in an analogous manner. In particular, the right aircraft light may be a right aircraft navigation light and the left aircraft light may be a left aircraft navigation light. Further in particular, each of the right aircraft navigation light and the left aircraft navigation may comprise at least one first light source, at least one second light source, at least one third light source, and at least one fourth light source, as described above. In this way, each of the right aircraft light and the left aircraft light may be capable of providing both a green navigation light output and a red navigation light output. Further in particular, both the right aircraft navigation light and the left aircraft navigation light may be of substantially identical design. In particular, the arrangement and cooperation of the light sources, the optical systems, the control unit, and the orientation sensor, if present, may be identical between the right aircraft navigation light and the left aircraft navigation light. It is also possible that the right aircraft navigation light is configured to provide green navigation light outputs only and that the left aircraft navigation light is configured to provide red navigation light outputs only. Alternatively, each of the right aircraft light and the left aircraft light may be a logo light.

Exemplary embodiments of the invention further include a method of operating an aircraft light that is arranged on a foldable wing tip of an aircraft, wherein the aircraft light has a first lighting structure with at least one first light source and a first optical system, in operation generating a first light output, and a second lighting structure with at least one second light source and a second optical system, in operation generating a second light output, wherein the first light output and the second light output are of the same color and wherein the first light output and the second light output are angled with respect to each other, the method comprising obtaining a wing tip orientation signal, which is indicative of an orientation of the foldable wing tip, and controlling the at least one first light source and the at least one second light source depending on the wing tip orientation signal. The modifications, additional features, and beneficial effects, described above with respect to the aircraft light, apply to the method of operating an aircraft light that is arranged on a foldable wing tip of an aircraft in an analogous manner. Method steps analogous to the properties of the aircraft light as described above are explicitly disclosed herewith. The aircraft light may in particular be an aircraft navigation light. The term obtaining the wing tip orientation signal encompasses all of receiving the wing tip orientation signal from outside of the aircraft light, generating the wing tip orientation signal within the aircraft light, and partly receiving information and partly generating information, which jointly form the wing tip orientation signal.

According to a further embodiment, the step of controlling the at least one first light source and the at least one second light source comprises turning on the at least one first light source, when the wing tip orientation signal indicates a folded up position of the foldable wing tip, and turning on the at least one second light source, when the wing tip orientation signal indicates a laterally extended position of the foldable wing tip. It may further comprise turning off the at least one second light source, when the wing tip orientation signal indicates the folded up position of the foldable wing tip, and turning off the at least one first light source, when the wing tip orientation signal indicates the laterally extended position of the foldable wing tip.

BRIEF DESCRIPTION OF THE FIGURES

Further exemplary embodiments of the invention are described below with respect to the accompanying drawings, wherein.

DETAILED DESCRIPTION

Figure 1:
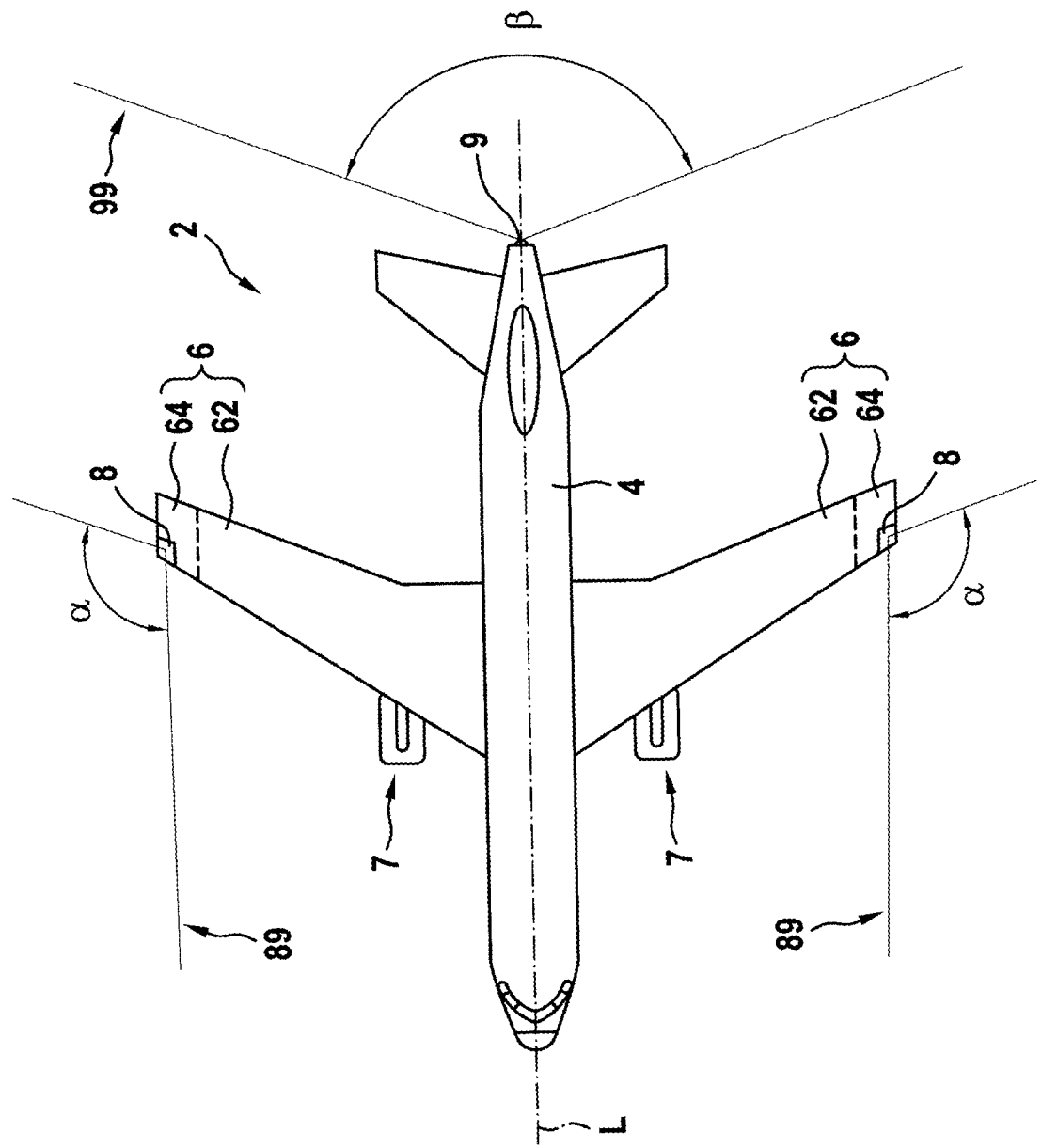
FIG. 1 depicts a schematic top view of an aircraft in accordance with an exemplary embodiment of the invention, the aircraft being equipped with two aircraft navigation lights, arranged in the wing tips of the wings, in accordance with exemplary embodiments of the invention.

FIG. 1 depicts a schematic top view of an aircraft 2, in particular an air plane 2, comprising a fuselage 4 and two wings 6 extending laterally from the fuselage 4. An engine 7 is mounted to each of the wings 6, respectively. Each of the wings 6 has a main wing portion 62 and a foldable wing tip 64. In particular, the right wing 6 has a right main wing portion 62 and a right foldable wing tip 64, and the left wing 6 has a left main wing portion 62 and left foldable wing tip 64. Respective hinge assemblies between the main wing portions 62 and the foldable wing tips 64 are indicated with dashed lines in FIG. 1.

The aircraft 2 is provided with three aircraft navigation lights 8, 9, which may also be referred to as aircraft position lights 8, 9. The aircraft navigation lights 8, 9 include a tail aircraft navigation light 9, mounted to a tail end of the fuselage 4, and two forward aircraft navigation lights 8, respectively mounted to the foldable wing tips 64 of the wings 6. The aircraft navigation lights 8, arranged in the foldable wing tips 64, are aircraft navigation lights in accordance with exemplary embodiments of the invention. The aircraft navigation lights 8 may be adapted to the respective sides of the aircraft 2 or may be of substantially identical design, with their operation differing depending on their mounting position in the aircraft frame of reference, as will be described below. In the latter case, the aircraft navigation lights 8 may also be referred to as multi-mode aircraft navigation lights due to their capacity of being employed both as right forward aircraft navigation lights and left forward aircraft navigation lights.

When projected onto a virtual horizontal plane, the light output 89 emitted by the aircraft navigation lights 8 covers an area extending from the direction of flight, i.e. 0°, which is parallel to a longitudinal axis L of the aircraft 2, outwardly over an angle $\alpha$ of 110°, i.e. 20° in the rearward direction. The aircraft navigation light 8 mounted to the starboard side, i.e. to the right side when viewed in the direction of flight, emits green light, and the aircraft navigation light 8 mounted to the port side, i.e. to the left side when viewed in the direction of flight, emits red light.

The tail aircraft navigation light 9 emits a white light output 99. The light output 99 of the tail aircraft navigation light 9 extends over an angle $\beta$ of 140° (+/−70°) in the virtual horizontal plane. The light output 99 of the tail aircraft navigation light 9 is centered around the longitudinal axis L of the aircraft 2.

The light outputs 89, 99 of the three aircraft navigation lights 8, 9, in combination, cover a full circle of 360° so that one of the three aircraft navigation lights 8, 9 is visible from any position around the aircraft 2.

Figure 2:
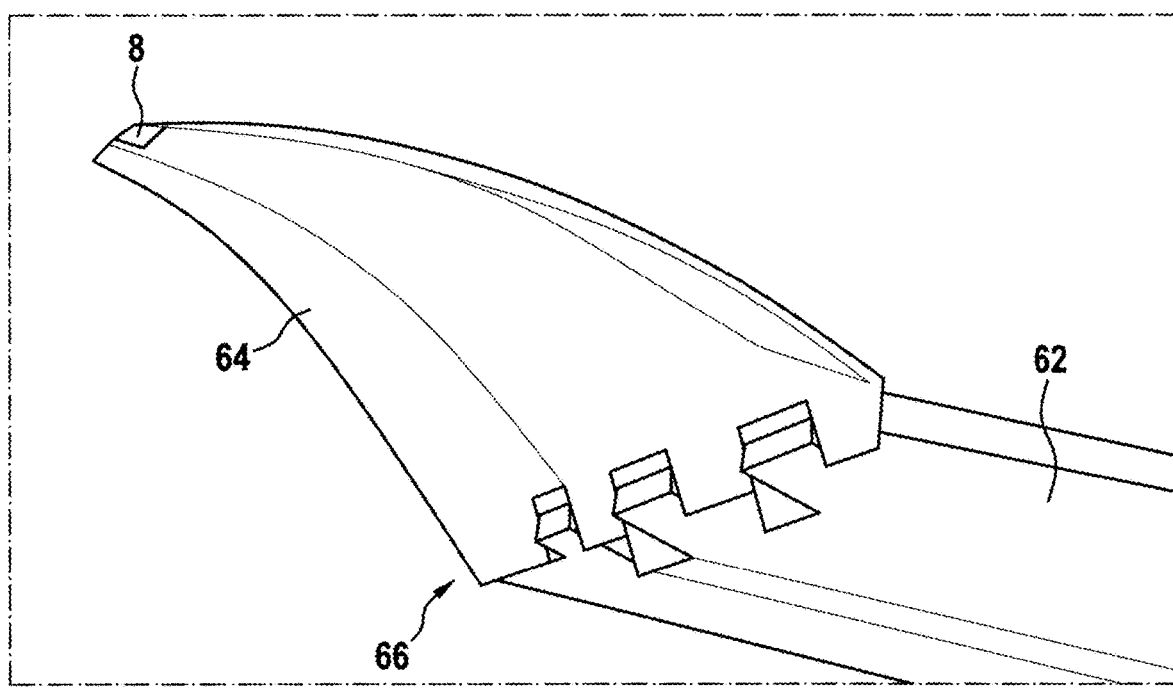
FIG. 2 shows a perspective view of a foldable wing tip of an aircraft in accordance with an exemplary embodiment of the invention, the foldable wing tip being equipped with an aircraft navigation light in accordance with an exemplary embodiment of the invention.

FIG. 2 shows a perspective view of a right foldable wing tip 64 and a part of a right main wing portion 62 of an aircraft in accordance with an exemplary embodiment of the invention. A hinge assembly 66 is provided between the main wing portion 62 and the foldable wing tip 64. The hinge assembly allows for moving the foldable wing tip 64 between a folded up position and a laterally extended position with respect to the main wing portion 62. FIG. 2 shows an intermediate position during the transition from the laterally extended position of the foldable wing tip 64 and the folded up position of the foldable wing tip 64. By folding up the foldable wing tip 64 on the ground, the wing span of the aircraft may be reduced, making the taxiing on an airport easier and saving parking space at the gate or on the air field.

In the depicted embodiment of FIG. 2, the hinge assembly 66 is comprised of various hinge parts both on the side of the main wing portion 62 and the foldable wing portion 64, which mesh in a tooth-like manner. The hinge parts are engaged with each other via a mounting rod or similar structure. The foldable wing portion 64 is rotatable with respect to the main wing portion 62.

The foldable wing tip 64 is equipped with an aircraft navigation light 8 in accordance with an exemplary embodiment of the invention. In the depicted embodiment, the aircraft navigation light 8 is arranged close to the lateral outer end of the foldable wing tip 64 and in a front edge region thereof. The aircraft navigation light 8 may also be arranged in other parts of the foldable wing tip 64. The aircraft navigation light 8 has a lens cover, e.g. a transparent plastics cover for light emission therethrough, which is aerodynamically shaped and which blends into the aerodynamic contour of the foldable wing tip 64.

Figure 3A:
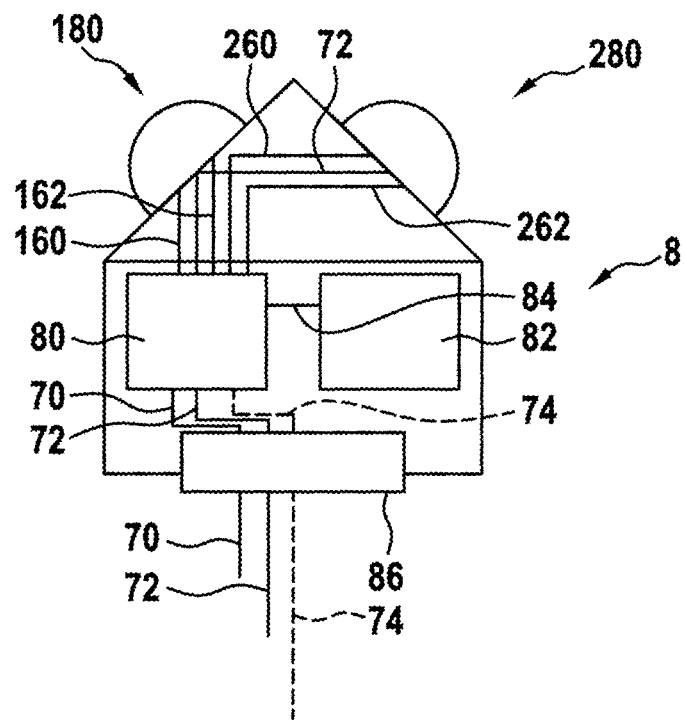
FIG. 3A shows A block diagram of aircraft navigation lights in accordance with two exemplary embodiments of the invention.

FIG. 3A shows a block diagram of an aircraft navigation light 8 in accordance with an exemplary embodiment of the invention. The aircraft navigation light 8 has a first lighting structure 180 and a second lighting structure 280. Each of the first lighting structure 180 and the second lighting structure 280 has a green LED, a red LED, and an optical system. In particular, the first lighting structure 180 has a first LED, which is a green LED, a third LED, which is a red LED, and a first optical system, which comprises a first lens and a first shutter. The second lighting structure 280 has a second LED, which is a green LED, a fourth LED, which is a red LED, and a second optical system, which comprises a second lens and a second shutter. Both the first lighting structure 180 and the second lighting structure 280 are able to provide a green navigation light output and a red navigation light output. The details of the first and second lighting structures 180, 280 will be described in detail below, in particular with respect to FIGS. 6 to 8. The following description of FIG. 3 focuses on the electric connections of the first and second lighting structures 180, 280 and the remaining components of the aircraft navigation light 8, in particular on the control components thereof.

The aircraft navigation light 8 has a control unit 80, an orientation sensor 82, and a power and control interface 86. The power and control interface 86 is configured to be connected to a power line 70, such as a power supply line of an aircraft on-board electricity distribution network, to a ground connection 72, and to an additional command input line 74. The power and control interface 86 is coupled to the control unit 80. The power line 70, the ground connection 72, and the additional command input line 74 are passed on to the control unit 80 via the power and control interface 86. The power and control interface 86 may provide suitable connectors between the outside and the inside of the aircraft navigation light 8 only. It is also possible that the power and control interface 86 provides filter circuits for the inputs of the power line 70, the ground connection 72, and the additional command input line 74 and/or that the power and control interface 86 provides suitable safety circuitry between the inside and the outside of the aircraft navigation light 8.

The orientation sensor 82 is coupled to the control unit 80 via a wing tip orientation signal line 84. In operation, the orientation sensor 82 generates a wing tip orientation signal and provides said wing tip orientation signal to the control unit 80 via the wing tip orientation signal line 84. In particular, the orientation sensor 80 is configured to sense the orientation of the aircraft navigation light 8 and provides a wing tip orientation signal to the control unit 80 that is indicative of the orientation of the aircraft navigation light 8. In particular, the orientation sensor 80 may be configured to provide a wing tip orientation signal to the control unit 80 that is indicative of a rotation angle of the aircraft navigation light 8 with respect to a rotation axis. In this way, the wing tip orientation signal is indicative of an orientation of the foldable wing tip in which the aircraft navigation light 8 is arranged. The orientation sensor 82 may be an inertial sensor or any other suitable kind of orientation sensor.

The control unit 80 is coupled to the first lighting structure 180 via a first power supply line 160, supplying power to the first LED, and via a third power supply line 162, supplying power to the third LED. Further, the control unit 80 is coupled to the second lighting structure 280 via a second power supply line 260, supplying power to the second LED, and a via a fourth power supply line 262, supplying power to the fourth LED. In this way, the control unit 80 is able to selectively provide a first navigation light output, which is a green navigation light output emitted by the first lighting structure 180, provide a second navigation light output, which is a green navigation light output emitted by the second lighting structure 280, provide a third navigation light output, which is a red navigation light output emitted by the first lighting structure 180, and/or provide a fourth navigation light output, which is a red navigation light output emitted by the second lighting structure 280. The control unit 80 is further coupled to the first lighting structure 180 and to the second lighting structure 280 via ground line 72.

In the exemplary embodiment of FIG. 3A, the control unit 80 is configured to selectively supply power to the first to fourth LEDs via the first, second, third, and fourth power supply lines 160, 260, 162, 262 in response to the wing tip orientation signal, provided via the wing tip orientation signal line 84, and in response to additional control commands, provided via the additional command line 74. The additional control commands may be override commands and/or commands for additional functionality, such as parking light functionality. Details of the control of the first and second lighting structures 180, 280 will be described below with respect to FIG. 5.

Figure 3B:
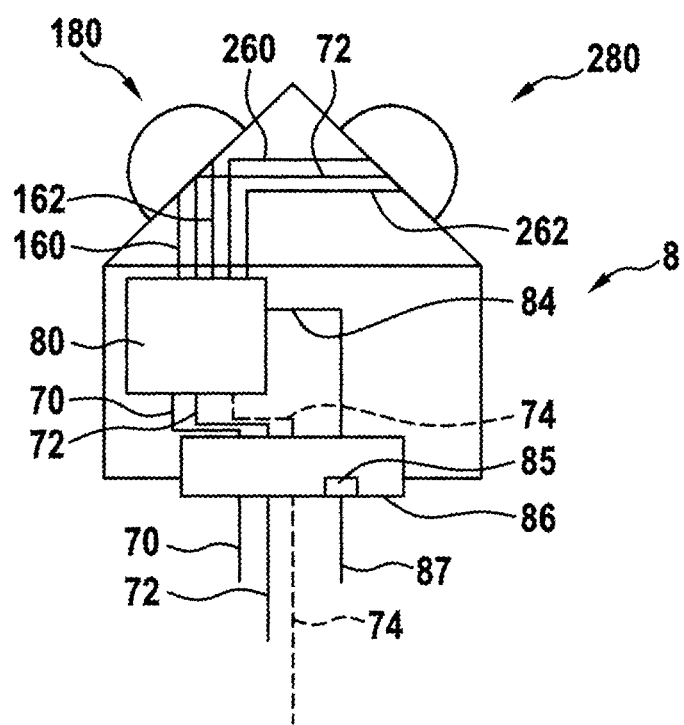
FIG. 3B shows A block diagram of aircraft navigation lights in accordance with two exemplary embodiments of the invention.

FIG. 3B shows a block diagram of an aircraft navigation light 8 in accordance with another exemplary embodiment of the invention. The aircraft navigation light 8 of FIG. 3B is similar to the aircraft navigation light 8 of FIG. 3A, with like elements having like reference numerals. Reference is made to the description thereof with respect to FIG. 3A. The aircraft navigation light 8 of FIG. 3B does not have an orientation sensor. Instead, the aircraft navigation light 8 of FIG. 3B has an orientation signal input 85. The orientation signal input 85 couples the wing tip orientation signal line 84 to an external wing tip orientation signal line 87. The control unit 80 thus receives the wing tip orientation signal from outside of the aircraft navigation light 80. The external wing tip orientation signal line 87 and the additional command input line 74 may also be combined into a single signal line. It is also possible that the orientation signal input 85 consists of two pins, with each of the pins being used for conveying binary on/off information with respect to one of the first and second navigation light outputs, respectively.

FIG. 4 illustrates the operation of an aircraft navigation light 8 in accordance with an exemplary embodiment of the invention for different orientations of a foldable wing tip 64 of an aircraft 2, equipped with the aircraft navigation light 8. The aircraft navigation light 8 is provided in the right wing tip of the aircraft 2. The aircraft navigation light 8 may be an aircraft navigation light 8 as described above with respect to FIG. 3. It is also possible that the aircraft navigation light 8 of FIG. 4 is an aircraft navigation light particularly adapted to being used for a right wing tip, such as an aircraft navigation light having green LEDs only and providing green navigation light outputs only.

Figure 4A:
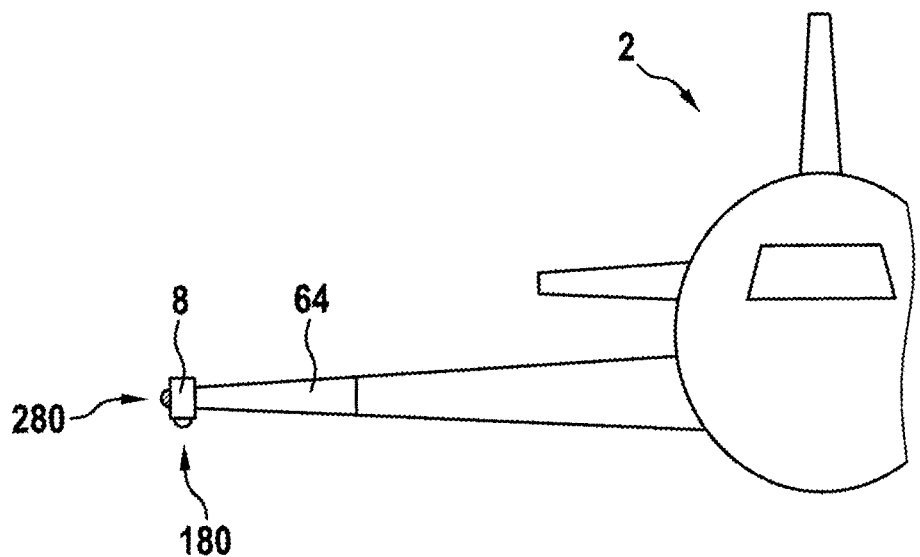
FIG. 4A illustrates the operation of an aircraft navigation light in accordance with an exemplary embodiment of the invention for one orientations of a wing tip of an aircraft, equipped with the aircraft navigation light.

In FIG. 4A, the aircraft 2 is shown with the right foldable wing tip 64 in a laterally extended position. The aircraft navigation light 8 emits a green navigation light output via the second lighting structure 280, referred to as second navigation light output. In this way, the aircraft navigation light 8 is able to provide a lateral green navigation light output in the aircraft frame of reference in accordance with the Federal Aviation Regulations (FAR).

Figure 4B:
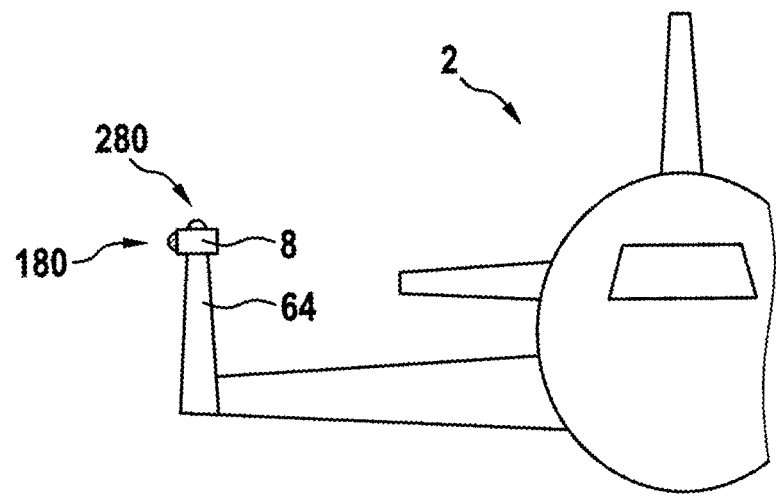
FIG. 4B illustrates the operation of an aircraft navigation light in accordance with an exemplary embodiment of the invention for another orientations of a wing tip of an aircraft, equipped with the aircraft navigation light.

In FIG. 4B, the aircraft 2 is shown with the right foldable wing tip 64 in a folded up position. The aircraft navigation light 8 emits a green navigation light output via the first lighting structure 180, referred to as first navigation light output. In this way, the aircraft navigation light 8 is able to provide a lateral green navigation light output in the aircraft frame of reference in accordance with the Federal Aviation Regulations (FAR).

Figure 4C:
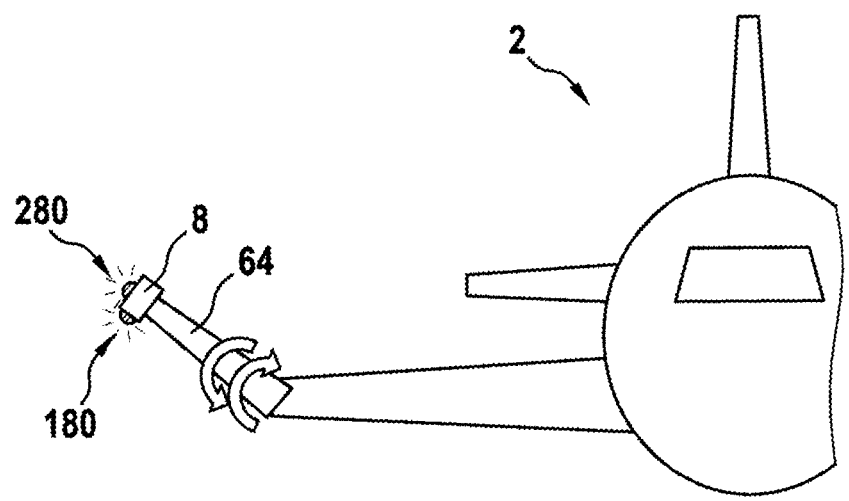
FIG. 4C illustrates the operation of an aircraft navigation light in accordance with an exemplary embodiment of the invention for another orientations of a wing tip of an aircraft, equipped with the aircraft navigation light.

In FIG. 4C, the aircraft 2 is shown with the right foldable wing tip 64 between the folded up position and the laterally extended position. The right foldable wing tip 64 is in motion between the folded up position and the laterally extended position. In particular, the movement of the right foldable wing tip 64 may be from the folded up position to the laterally extended position or may be from the laterally extended position to the folded up position. The aircraft navigation light 8 emits a flashing green navigation light output via the first lighting structure 180 and emits a flashing green navigation light output via the second lighting structure 280. In this way, the navigation aircraft light 8 indicates the movement of the foldable wing tip 64 via the flashing light output. It is pointed out that the flashing light output for signalling the movement of the foldable wing tip 64 is an optional feature of the aircraft navigation light. It is further pointed out that the aircraft navigation light 8 may also be configured to provide a flashing light output of a different color, as will be described below with respect to FIG. 5.

FIG. 5 illustrates the operation of an aircraft navigation light 8 in accordance with an exemplary embodiment of the invention for different orientations of the aircraft navigation light 8. The aircraft navigation light 8 of FIG. 5 may be an aircraft navigation light 8, as described above with resect to FIG. 3. The aircraft navigation light 8 is configured to selectively generate the first navigation light output, the second navigation light output, the third navigation light output, and the fourth navigation light output, as described above. In particular, the aircraft navigation light 8 is configured to selectively generate the first to fourth navigation light outputs, depending on the wing tip orientation signal and the additional command signal. FIGS. 5A to 5H describe the light output of the aircraft navigation light 8 for different orientations of the aircraft navigation light 8 and/or different additional control commands. In analogy to FIG. 4, the aircraft navigation light 8 is shown from the position of an observer standing in front of the nose of the aircraft.

Figure 5A:
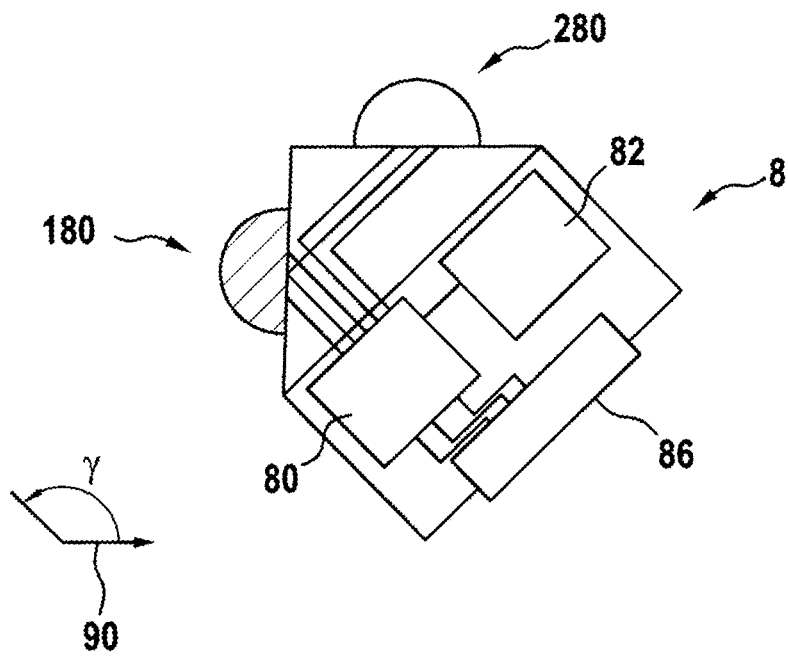
FIG. 5A illustrates the operation of an aircraft navigation light in accordance with an exemplary embodiment of the invention for different orientations of the aircraft navigation light.

In FIG. 5A, the aircraft navigation light 8 is depicted at an angle of $\gamma=135°$ with respect to a reference direction 90. In particular, the aircraft navigation light 8 is depicted rotated by an angle of $\gamma=135°$ around an axis of rotation, running orthogonally through the drawing plane of FIG. 5. The angle $\gamma$ is defined as the angle between the reference direction 90 and the direction running from the middle of the power and control interface 86 through the aircraft navigation light 8 and in between the first lighting structure 180 and the second lighting structure 280. The angle $\gamma$ may be defined in any other suitable manner and the behavior of the aircraft navigation light 8 may be adapted accordingly to the different angle values. The orientation sensor 82 senses said angle $\gamma$ and communicates said angle $\gamma$ to the control unit 80 as the wing tip orientation signal. In addition, the aircraft navigation light 8 receives an aircraft parking signal on the additional command line. On the basis of these two pieces of information, the control unit 80 supplies power to both the green LED of the first lighting structure 180 and the red LED of the first lighting structure 180. In particular, the control unit 80 supplies power to both the green LED and the red LED in such a way that the intensities of the green light and the red light mix to provide a yellowish light output. This yellowish light output is output in a continuous manner. The continuous yellowish light output indicates a parked position of the aircraft and indicates a lateral extension of the right wing span of the aircraft.

Figure 5B:
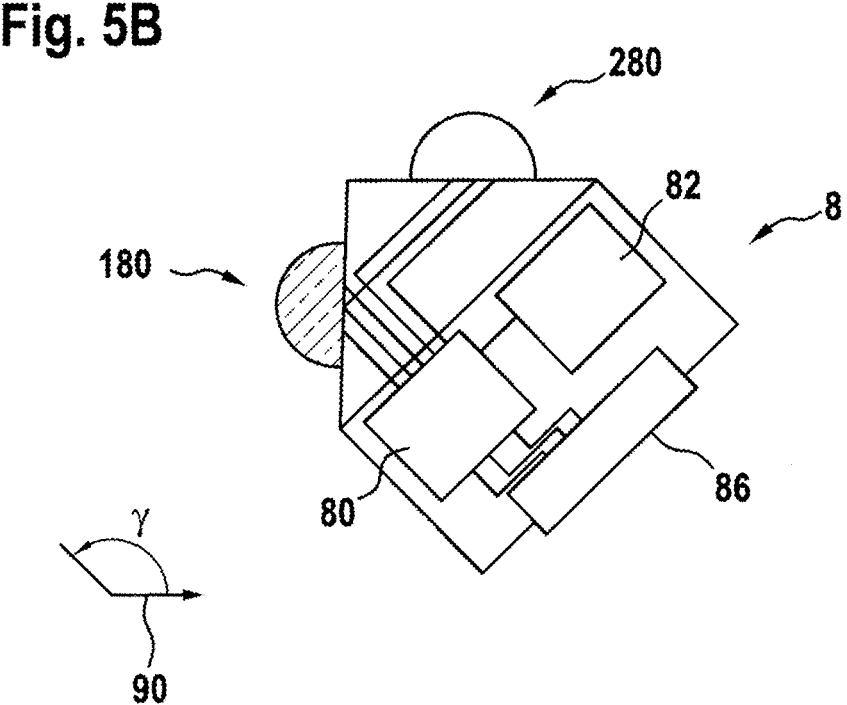
FIG. 5B illustrates the operation of an aircraft navigation light in accordance with an exemplary embodiment of the invention for different orientations of the aircraft navigation light.

In FIG. 5B, the aircraft navigation light 8 is again depicted at an angle of $\gamma=135°$ with respect to the reference direction 90. Again, the orientation sensor 82 senses said angle $\gamma$ and communicates said angle $\gamma$ to the control unit 80 as the wing tip orientation signal. As compared to FIG. 5A, the aircraft navigation light 8 does not receive the aircraft parking signal. In the absence of the aircraft parking signal, the control unit 80 determines that the aircraft navigation light is in a navigation lighting mode. Further, on the basis of the wing tip orientation signal indicating a rotation angle of $\gamma=135°$, the control unit determines that the aircraft navigation light 8 is arranged in the right wing tip of the aircraft and that the right wing tip is in a folded up position. The aircraft navigation light 8 supplies power to the green LED of the first lighting structure 180 and, thus, generates the first navigation light output, i.e. the green navigation light output via the first lighting structure 180.

Figure 5C:
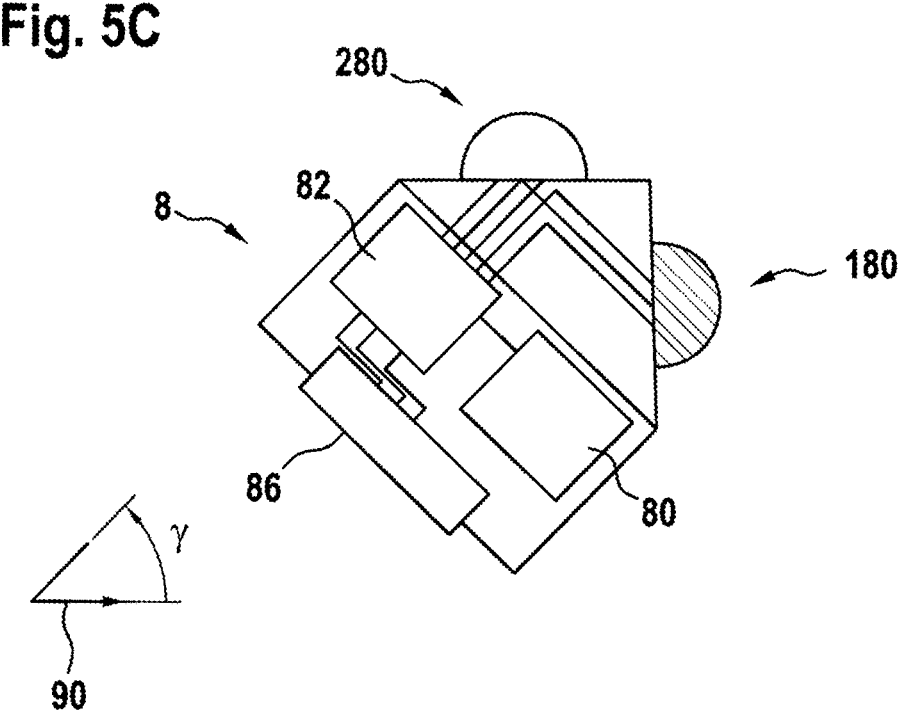
FIG. 5C illustrates the operation of an aircraft navigation light in accordance with an exemplary embodiment of the invention for different orientations of the aircraft navigation light.

In FIG. 5C, the aircraft navigation light 8 is depicted at an angle of $\gamma=45°$ with respect to the reference direction 90. The orientation sensor 82 senses said angle $\gamma$ and communicates said angle $\gamma$ to the control unit 80 as the wing tip orientation signal. Further, the aircraft navigation light 8 does not receive an aircraft parking signal. In the absence of the aircraft parking signal, the control unit 80 determines that the aircraft navigation light is in a navigation lighting mode. Further, on the basis of the wing tip orientation signal indicating a rotation angle of $\gamma=45°$, the control unit determines that the aircraft navigation light 8 is arranged in the left wing tip of the aircraft and that the left wing tip is in a folded up position. The aircraft navigation light 8 supplies power to the red LED of the second lighting structure 280 and, thus, generates the fourth navigation light output, i.e. the red navigation light output via the second lighting structure 280.

Figure 5D:
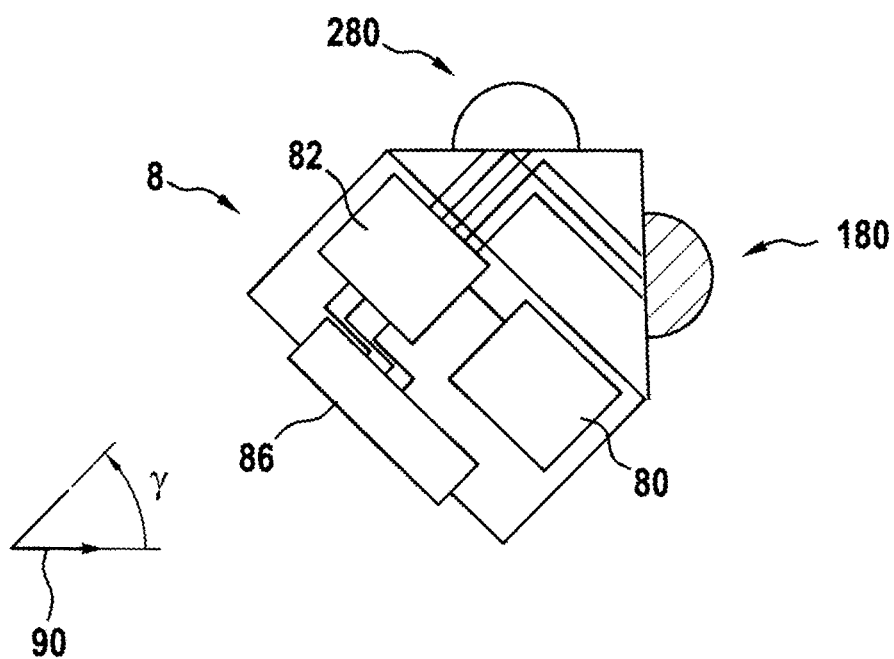
FIG. 5D illustrates the operation of an aircraft navigation light in accordance with an exemplary embodiment of the invention for different orientations of the aircraft navigation light.

In FIG. 5D, the aircraft navigation light 8 is again depicted at an angle of $\gamma=45°$ with respect to the reference direction 90. The orientation sensor 82 senses said angle $\gamma$ and communicates said angle $\gamma$ to the control unit 80 as the wing tip orientation signal. Further, the aircraft navigation light 8 receives an aircraft parking signal. On the basis of these two pieces of information, the control unit 80 supplies power to both the green LED of the second lighting structure 280 and the red LED of the second lighting structure 280. In particular, the control unit 80 supplies power to both the green LED and the red LED in such a way that the intensities of the green light and the red light mix to provide a yellowish light output. This yellowish light output is output in a continuous manner. The continuous yellowish light output indicates a parked position of the aircraft and indicates a lateral extension of the left wing span of the aircraft.

Figure 5E:
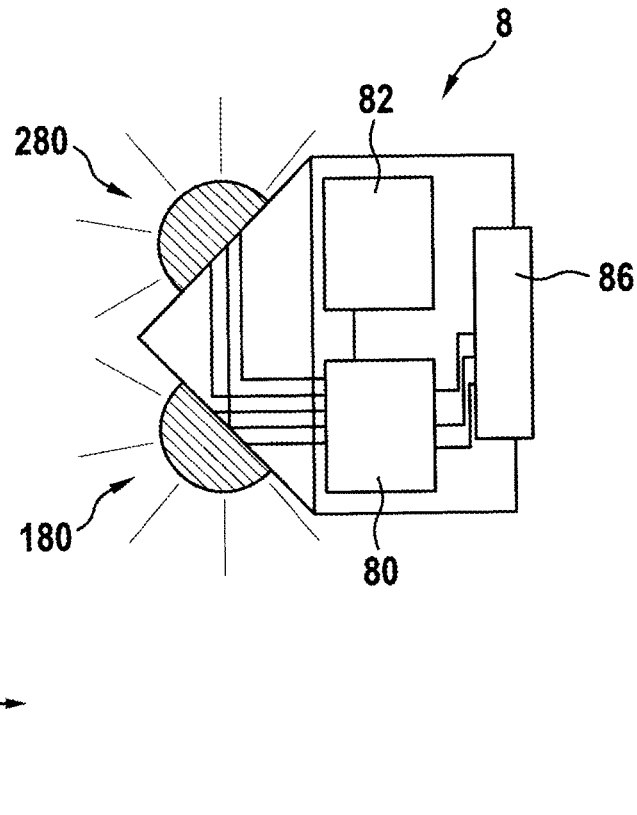
FIG. 5E illustrates the operation of an aircraft navigation light in accordance with an exemplary embodiment of the invention for different orientations of the aircraft navigation light.

In FIG. 5E, the aircraft navigation light 8 is depicted at an angle of $\gamma=180°$ with respect to the reference direction 90. The orientation sensor 82 senses said angle $\gamma$ and communicates said angle $\gamma$ to the control unit 80 as the wing tip orientation signal. Further, the aircraft navigation light 8 does not receive an aircraft parking signal. In the absence of the aircraft parking signal and on the basis of the wing tip orientation signal indicating a rotation angle of $\gamma=180°$, the control unit 80 determines that the aircraft navigation light 8 is arranged in the right wing tip of the aircraft and that right wing tip is between the folded up position and the laterally extended position. On the basis of this determination, the control unit 80 supplies power to both the green and red LEDs of the first lighting structure 180 and the green and red LEDs of the second lighting structure 280. In particular, the control unit 80 supplies power to both the green LEDs and the red LEDs in such a way that the intensities of the green light and the red light mix to provide an orange light output. Further in particular, the control unit 80 supplies power to both the green LEDs and the red LEDs in such a way that the orange light output is provided in a flashing manner. The flashing orange light output indicates that the foldable wing tip is in motion between the folded up position and the laterally extended position.

Figure 5F:
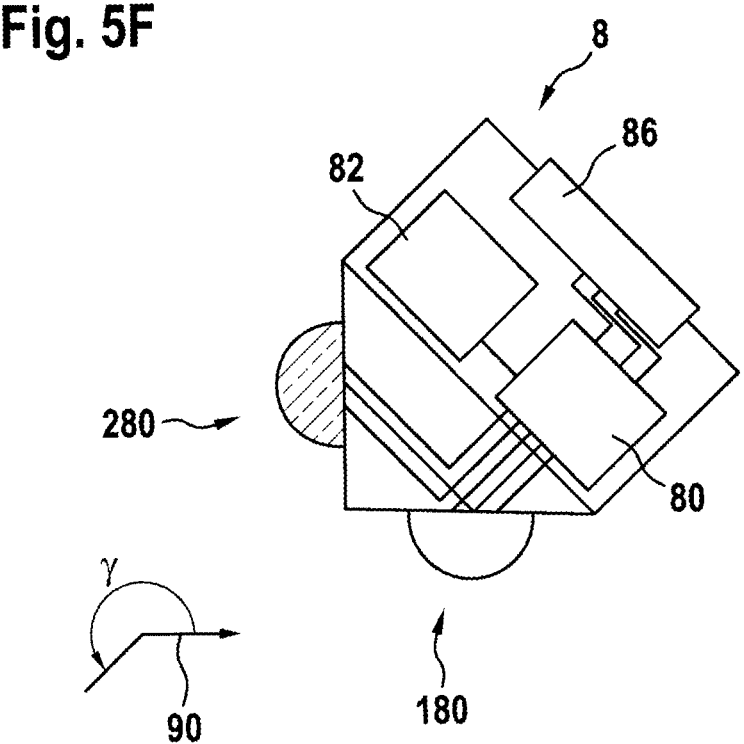
FIG. 5F illustrates the operation of an aircraft navigation light in accordance with an exemplary embodiment of the invention for different orientations of the aircraft navigation light.

In FIG. 5F, the aircraft navigation light 8 is depicted at an angle of γ=225° with respect to the reference direction 90. Again, the orientation sensor 82 senses said angle γ and communicates said angle γ to the control unit 80 as the wing tip orientation signal. Further, the aircraft navigation light 8 does not receive an aircraft parking signal. In the absence of the aircraft parking signal, the control unit 80 determines that the aircraft navigation light is in a navigation lighting mode. Further, on the basis of the wing tip orientation signal indicating a rotation angle of γ=225°, the control unit determines that the aircraft navigation light 8 is arranged in the right wing tip of the aircraft and that the right wing tip is in a laterally extended position. The aircraft navigation light 8 supplies power to the green LED of the second lighting structure 280 and, thus, generates the second navigation light output, i.e. the green navigation light output via the second lighting structure 280.

Figure 5G:
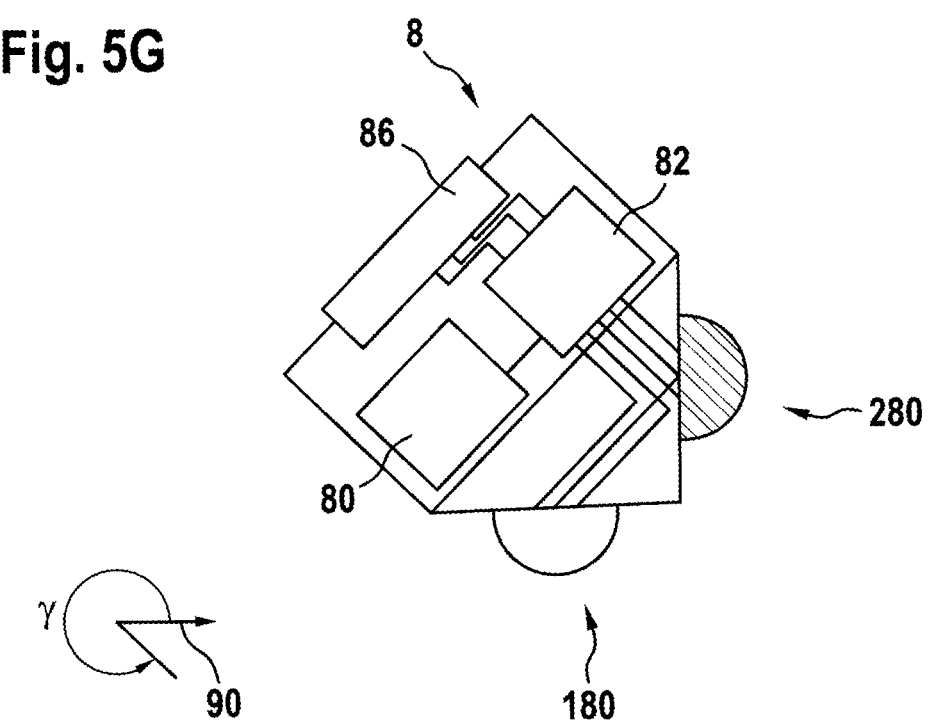
FIG. 5G illustrates the operation of an aircraft navigation light in accordance with an exemplary embodiment of the invention for different orientations of the aircraft navigation light.

In FIG. 5G, the aircraft navigation light 8 is depicted at an angle of γ=315° with respect to the reference direction 90. The orientation sensor 82 senses said angle γ and communicates said angle γ to the control unit 80 as the wing tip orientation signal. Further, the aircraft navigation light 8 does not receive an aircraft parking signal. In the absence of the aircraft parking signal, the control unit 80 determines that the aircraft navigation light is in a navigation lighting mode. Further, on the basis of the wing tip orientation signal indicating a rotation angle of γ=315°, the control unit determines that the aircraft navigation light 8 is arranged in the left wing tip of the aircraft and that the left wing tip is in a laterally extended position. The aircraft navigation light 8 supplies power to the red LED of the first lighting structure 180 and, thus, generates the third navigation light output, i.e. the red navigation light output via the first lighting structure 180.

Figure 5H:
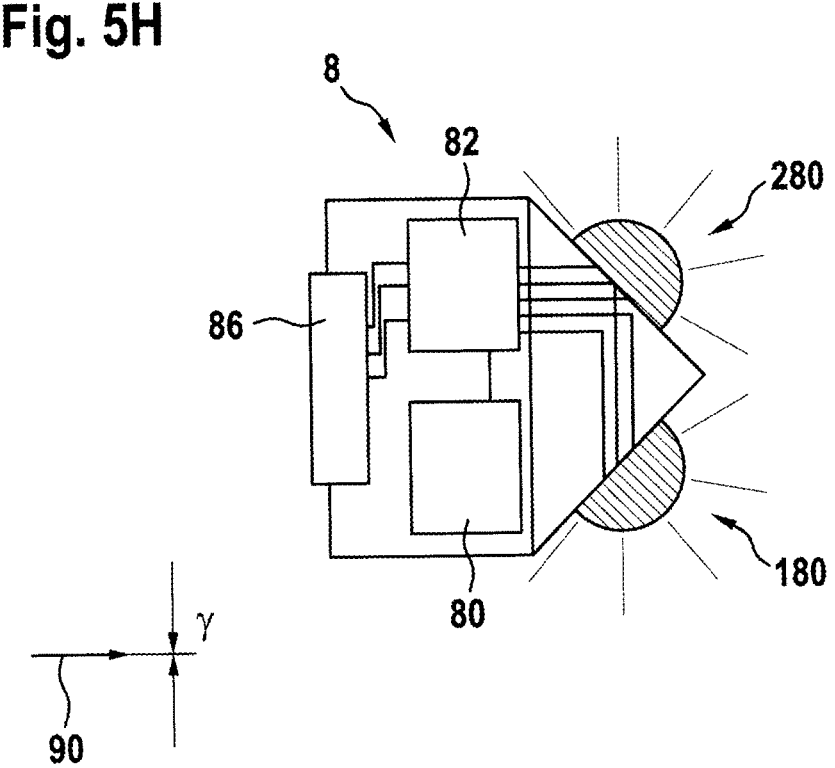
FIG. 5H illustrates the operation of an aircraft navigation light in accordance with an exemplary embodiment of the invention for different orientations of the aircraft navigation light.

In FIG. 5H, the aircraft navigation light 8 is depicted at an angle of γ=0° with respect to the reference direction 90. The orientation sensor 82 senses said angle γ and communicates said angle γ to the control unit 80 as the wing tip orientation signal. Further, the aircraft navigation light 8 does not receive an aircraft parking signal. In the absence of the aircraft parking signal and on the basis of the wing tip orientation signal indicating a rotation angle of γ=0°, the control unit 80 determines that the aircraft navigation light 8 is arranged in the left wing tip of the aircraft and that the left wing tip is between the folded up position and the laterally extended position. On the basis of this determination, the control unit 80 supplies power to both the green and LEDs of the first lighting structure 180 and the green and red LEDs of the second lighting structure 280. In particular, the control unit 80 supplies power to both the green LEDs and the red LEDs in such a way that the intensities of the green light and the red light mix to provide an orange light output. Further in particular, the control unit 80 supplies power to both the green LEDs and the red LEDs in such a way that the orange light output is provided in a flashing manner. The flashing orange light output indicates that the foldable wing tip is in motion between the folded up position and the laterally extended position.

As pointed out above, the angle values for the angle γ are exemplary only. The rotation angle may be defined in any suitable manner. Also, depending on the design of the foldable wing tip and the arrangement of the first and second lighting structures, sensed angular values in multiple dimensions may be used for controlling the light sources.

Figure 6:
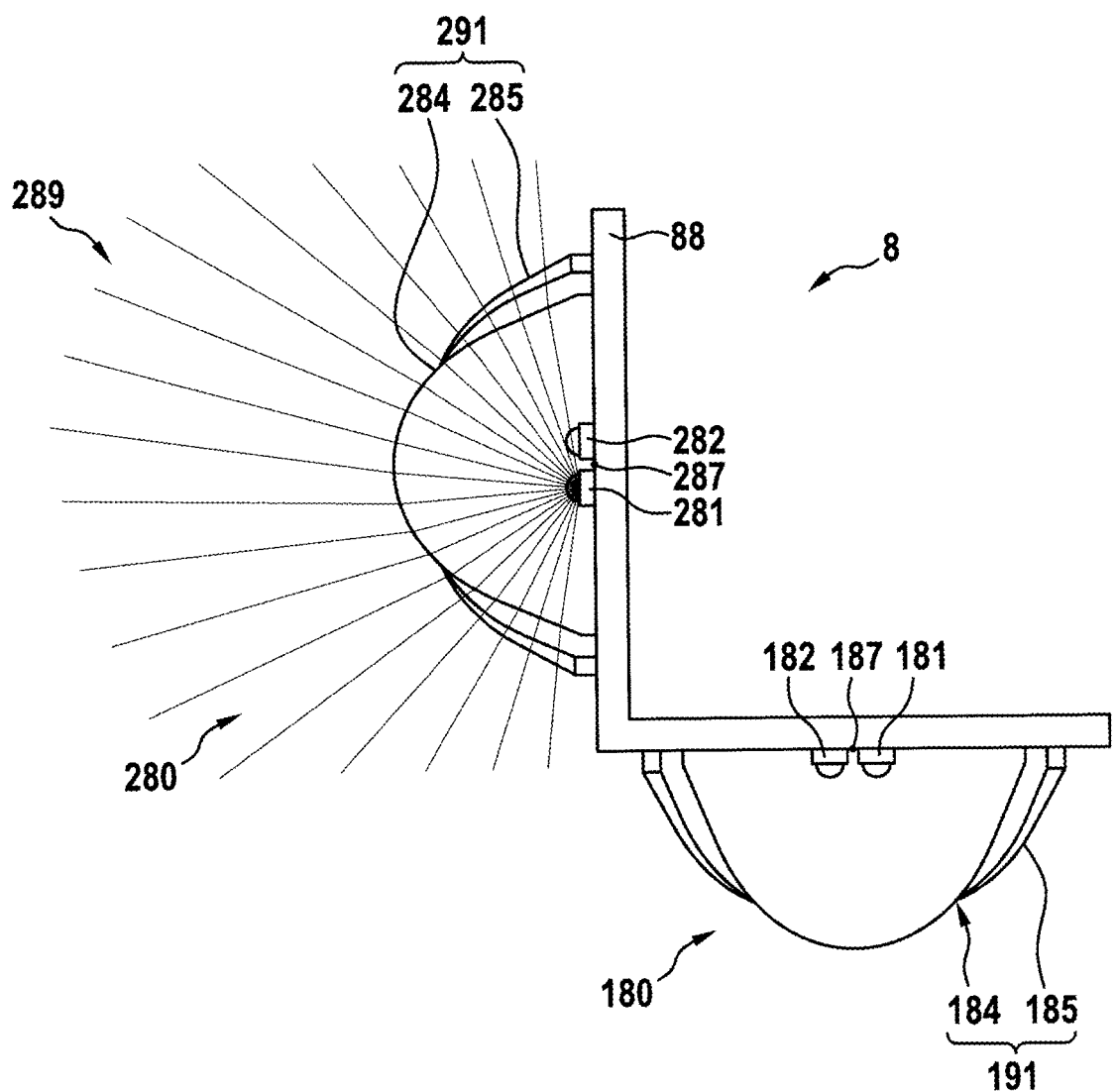
FIG. 6 shows a schematic cross-sectional view of selected components of an aircraft navigation light in accordance with an exemplary embodiment of the invention.

FIG. 6 shows a schematic cross-sectional view of selected components of an aircraft navigation light 8 in accordance with an exemplary embodiment of the invention. The aircraft navigation light 8 of FIG. 6 may be the aircraft navigation light 8, depicted in any of the preceding Figures. The cross-sectional view of FIG. 6 is taken along a vertical cross-sectional plane, which is perpendicular to the longitudinal extension of the aircraft fuselage, with the viewing direction being backward in the aircraft frame of reference. The aircraft navigation light 8 is arranged in a right foldable wing tip, which is in a laterally extended position in the operating situation of FIG. 6.

The aircraft navigation light 8 comprises a first lighting structure 180 and a second lighting structure 280. The first lighting structure 180 comprises two light sources 181, 182, namely a first light source 181, which is a green light source, and a third light source 182, which is a red light source, mounted to a common support plate 88. In the depicted exemplary embodiment, each of the first and third light sources 181, 182 is an LED. The first light source 181 is a green LED, and the third light source 182 is a red LED. The second lighting structure 280 comprises two light sources 281, 282, namely a second light source 281, which is a green light source, and a fourth light source 282, which is a red light source, mounted to the common support plate 88. In the depicted exemplary embodiment, each of the second and fourth light sources 281, 282 is an LED. The second light source 281 is a green LED, and the fourth light source 282 is a red LED.

The common support plate 88 has two legs that are orthogonal to each other. While the first and third light sources 181, 182 are arranged on a first one of the two legs, the second and fourth light sources 281, 282 are arranged on the second one of the two legs. In this way, the second and fourth light sources 281, 282 are angled with respect to the first and third light sources 181, 182, in particular orientated in an orthogonal manner. The common support plate 88 may be a printed circuit board (PCB), provided with electrical connections, which are configured for supplying electrical power to the first, second, third, and fourth light sources 181, 281, 182, 282.

The first and third light sources 181, 182 are covered by a common, at least partially transparent or translucent first lens 184. The first lens 184 may be overmolded over the first and third light sources 181, 182. It may thus be in direct contact with the first and third light sources 181, 182. The first lens 184 provides a transparent cover, covering and tightly encasing the first and third light sources 181, 182 with respect to the support plate 88, thus protecting the first and third light sources 181, 182. The first lens 184 may be made of silicone, in particular of silicone having a refractive index of about 1.4.

The first lens 184 not only covers the first and third light sources 181, 182, but further forms part of a first optical system 191 for the first and third light sources 181, 182, which is configured for shaping the navigation light output emitted by the first and third light sources 181, 182. It can also be said that the first optical system 191, in particular the lens 184 thereof, conditions the light emitted by the first and third light sources 181, 182. In the exemplary embodiment of FIG. 6, the first lens 184 mainly conditions the light of the first and third light sources 181, 182 via its refractive light exit surface. The first optical system 191 additionally comprises a first shutter 185, which is configured to block part of the light emitted by the first or third light sources 181, 182.

The first optical system 191, comprising the first lens 184 and the first shutter 185, is configured to generate a navigation light output that extends over an angle α of 110° in the horizontal plane, as it is shown in FIG. 1, and that extends over an angle of about 160° in the vertical plane. The first shutter 185 is in particular configured to block light emitted further backwards than the angle α=110° with respect to the direction of flight, i.e. configured to block light towards the sector of the tail navigation light.

The first shutter 185 and the first lens 184 are formed symmetrically with respect to a plane of symmetry, running through a reference point 187 and being orthogonal to the leg of the common support plate 88, to which the first and third light sources 181, 182 are mounted. This plane of symmetry is oriented horizontally, when the aircraft navigation light 8 is mounted to the aircraft 2 and when the first lighting structure is oriented to the lateral outside of the aircraft. The first optical system 191, including the first lens 184 and the first shutter 185, is designed for shaping the light emitted by a light source which is arranged at a first nominal light source location 187, also referred to as first reference point 187.

In the embodiment shown, none of the first and third light sources 181, 182 is arranged exactly at said first reference point 187. Instead, the first and third light sources 181, 182 are arranged symmetrically with respect to the plane of symmetry at the same distance from the first reference point 187. It is also possible that both the first light source 181 and the third light source 182 are arranged along the plane of symmetry.

The first optical system 191 is designed so that small deviations of the positions of the light sources from the optimal first reference point 187 do not considerably deteriorate the quality of the light output of the aircraft navigation light 8. I.e., the first optical system 191 and the first and third light sources 181, 182 are designed so that a desired light output having a desired light intensity distribution is generated and emitted by the aircraft navigation light 8 despite the fact that none of the first and third light sources 181, 182 is arranged exactly at the first reference point 187. Rather, the first optical system 91 and the first and third light sources 181, 182 are designed so that a desired light intensity distribution is achieved regardless of which one of the two light sources is switched on. In order to achieve this feature, the extension of the first optical system 191 may be at least an order of magnitude greater than the distance between the centers of the first and third light sources 181, 182. In other words, the first and third light sources 181, 182 may be arranged very close to each other, as compared to the extension of the first optical system 191. For example, the first optical system 191 may have an extension of between 20 mm and 50 mm, while the distance between the centers of the first and third light sources 181, 182 may be in the range of between 1 mm and 5 mm.

Depending on which one of the first light source 181 and the third light source 182 is switched on, the first lighting structure 180 may generate a green navigation light output, also referred to as first navigation light output, and a red navigation light output, also referred to as third navigation light output. Due to above described design of the first and third light sources 181, 182 being positioned closely to the first reference point 187 and the first optical system 191 having a large extension as compared to the offset from the first reference point 187, the output light intensity distribution is similar for red light and green light.

The second lighting structure 280 is analogous to the first lighting structure 180. In particular, the second lighting structure 280 is identical in design to the first lighting structure 180. It is arranged orthogonal to the first lighting structure 180 due to the two legs of the common support structure 88 being arranged orthogonal to each other.

In the operating situation of FIG. 6, the second light source 281 is turned on. In this way, the second navigation light output is provided. In particular, a green navigation light output is emitted laterally from the foldable wing tip, to which the aircraft navigation light is mounted.

Figure 7:
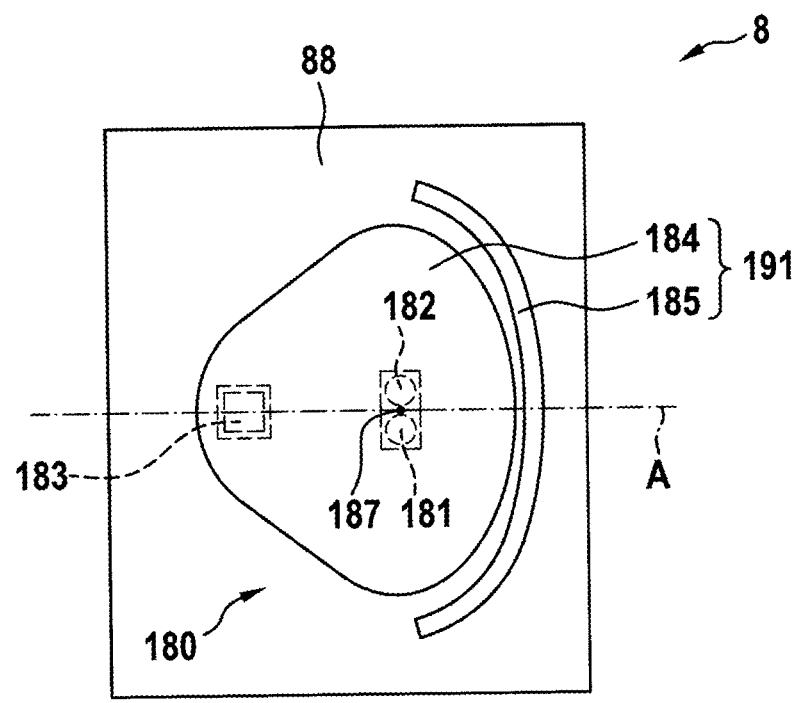
FIG. 7 shows a schematic side view of selected components of an aircraft navigation light in accordance with an exemplary embodiments of the invention.
Figure 8:
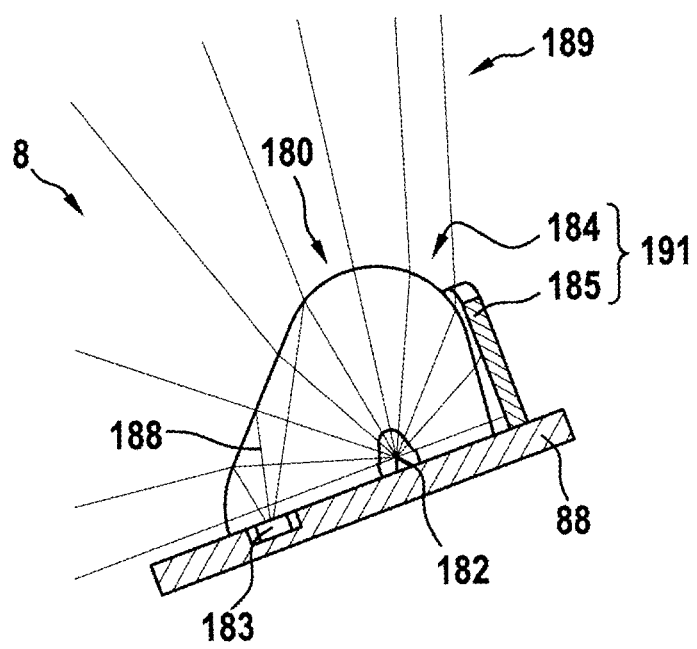
FIG. 8 shows a schematic cross-sectional view of the selected components of the aircraft navigation light of FIG. 7.

FIG. 7 shows a schematic side view of selected components of an aircraft navigation light 8 in accordance with another exemplary embodiment of the invention. In FIG. 7, only the first lighting structure 180, arranged on a common support structure 88, is depicted. FIG. 8 shows a schematic cross-sectional view of the selected components of FIG. 7, with the cross-sectional plane being indicated with reference character A in FIG. 7. The cross-sectional plane of FIG. 8 is a horizontal cross-sectional plane in the aircraft frame of reference, with the direction of flight being towards the top in the drawing plane of FIG. 8. It is understood that the second lighting structure 280 is of analogous design. The described components of the first lighting structure 180 have analogous components in the second lighting structure 280.

The first lighting structure 180 of the aircraft navigation light of FIGS. 7 and 8 is similar to the first lighting structure of the aircraft navigation light of FIG. 6 in that the first optical system 191 also comprises a first lens 184 and a first shutter 185. However, in the exemplary embodiments of FIGS. 7 and 8, the first shutter is configured to block light beyond the direction of flight, i.e. configured to block any light towards the sector of the respectively other one of the two wing tip aircraft navigation lights 8. In other words, instead of blocking backwards directed light, light emitted beyond the direction of flight is blocked. In order to provide a light output over an angular range of α=110° with the arrangement of FIGS. 7 and 8, the depicted portion of the common support structure 88 is angled with respect to the transverse direction in the aircraft frame of reference. Such an arrangement may be beneficial in terms of light output efficiency, because the main light emission direction of the LEDs, which is orthogonal to the common support structure 88, is similar to the direction of flight, which is required to have a high light intensity according to the FAR. Accordingly, the light output of the LEDs may be used in an efficient manner without much re-directing. As is apparent from geometric considerations, the angling of the depicted portion of the common support structure 88 may result in a relative orientation of the first and second lighting structures that is not orthogonal. In other words, the two portions of the common support structure 88, supporting the first and second lighting structures, may not be orthogonal, as was the case in the aircraft navigation light 8 of FIG. 6.

In addition to the first and third light sources 181, 182, a first wear detector 183, which is a photo detector, is mounted to the support plate 88. The first wear detector 183 is also covered and tightly encased with respect to the support plate 88 by the first lens 184. In the depicted exemplary embodiment, the first wear detector 183 is arranged around the plane of symmetry A, extending through the first lighting structure 180. As a result, the first and third light sources 181, 182 are arranged symmetrically with respect to the first wear detector 183. It is pointed out that the wear detector is an entirely optional element and may also be dispensed with.

In a region close to the first shutter 185, which is depicted on the right side in FIGS. 7 and 8, the first lens 184 has a curved portion with a curved cross-section. In a region more distant from the first shutter 185, i.e. in a region more to the left in FIGS. 7 and 8, the first lens 184 has a linear portion with a linear cross-section. A portion 188 of the light emitted by the first and third light sources 181, 182 is reflected by this linear portion of the first lens 184 towards the first wear detector 183. Based on the amount of reflected light, which is detected by the first wear detector 183, the wear state of each of first and third light sources 181, 182 may be determined. The linear portion of the first lens 184 may be partially refractive and partially reflective for the given incident angles of the light from the first and third light sources 181, 182. It is pointed out that the given shape/design of the first lens 184 is exemplary only and that various other shapes/designs may be provided.

Figure 9:
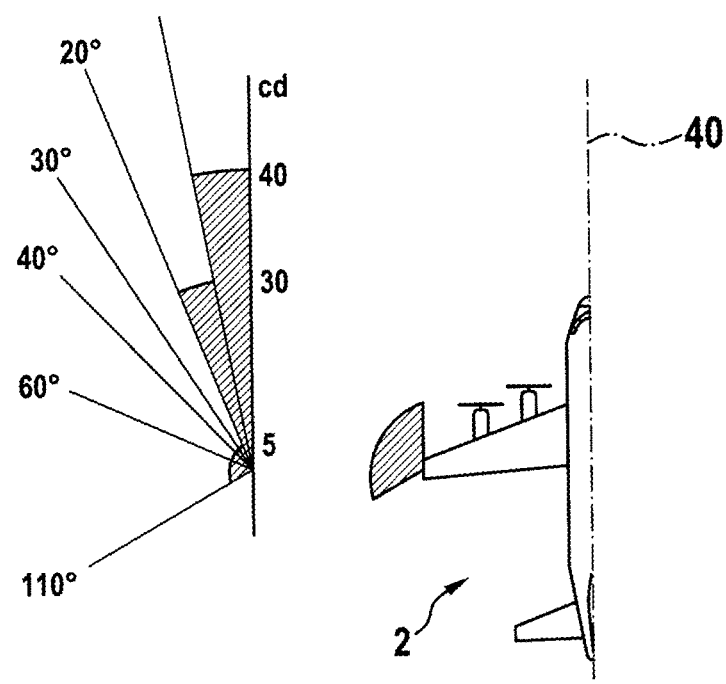
FIG. 9 illustrates the light intensity distribution of a left forward navigation light, as required by the Federal Aviation Regulations (FAR)

FIG. 9 illustrates the light intensity distribution of a left forward navigation light, as required by the Federal Aviation Regulations (FAR). In particular, FIG. 9 shows, on the right hand side, a schematic illustration of an air plane 2, having a longitudinal axis 40, coinciding with the nominal direction of flight. The light output of the left forward navigation light is indicated with a hatched sector around the left wing tip of the air plane 2. The required FAR light intensity values for forward navigation lights, as set out in FAR section 25.1391 for the horizontal plane, are depicted on the left side of FIG. 9. The FAR requirements cover an angular range between the longitudinal axis of the aircraft and an angle of 110° thereto. It is illustrated that the output light intensity distribution has three distinct output regions, namely a peak region of at least 40 cd between the longitudinal axis of the airplane and an angle of 10° thereto, a medium light intensity region of at least 30 cd between 10° and 20°, and a low light intensity region of at least 5 cd between 20° and 110°. The aircraft navigation light, described herein in the context of forward navigation lights, fulfills these requirements.

Figure 10:
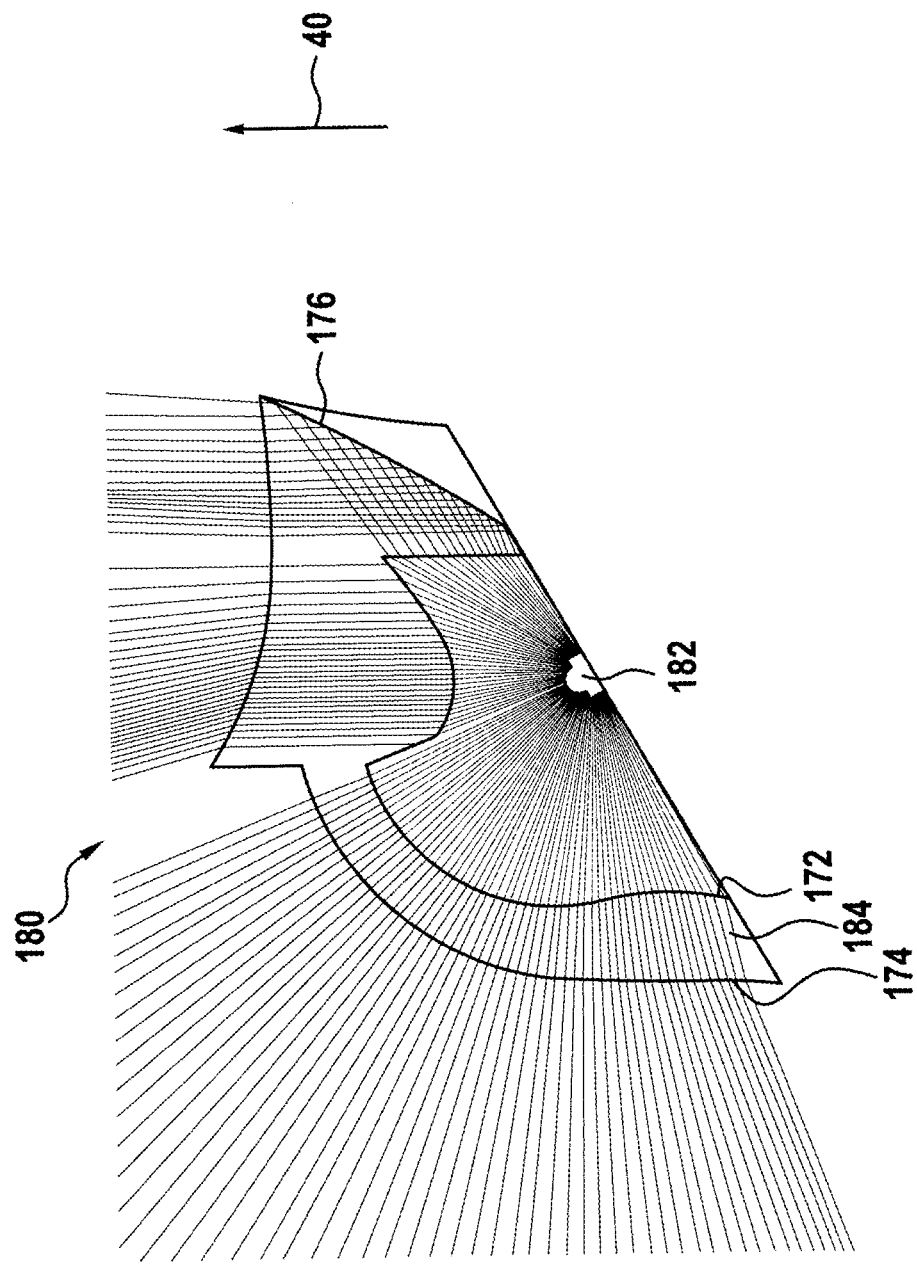
FIG. 10 shows a schematic cross-sectional view of selected components of a an aircraft navigation light according to a further exemplary embodiment of the invention.

FIG. 10 shows a schematic cross-sectional view of selected components of an aircraft navigation light 8 according to a further exemplary embodiment of the invention. In particular, FIG. 10 depicts the third light source 182 and a first lens 184, which is different from the first lens 184 discussed above. The cross-sectional view of FIG. 10 is analogous to the cross-sectional view of FIG. 8, both in terms of the orientation/position of the aircraft navigation light 8 and the cross-sectional plane therethrough. Hence, the first light source 181 is also not shown in FIG. 10, because it is more towards the observer of FIG. 10 than the cross-sectional plane.

The first lens 184 is an elaborate free form lens. In the exemplary embodiment of FIG. 10, the first optical system consists of the first lens 184. The first lens 184 of the exemplary embodiment of FIG. 10 has an internal refractive surface 172 and an external refractive surface 174. The light from the third light source 182 is conditioned both at the internal refractive surface 172, also referred to as light entry surface, and at the external refractive surface 174, also referred to as light exit surface. In addition, the first lens 184 has a total internal reflection portion 176. Some of the light from the third light source 182 is internally reflected at the total internal reflection portion 176, before leaving the first lens 184 at the external refractive surface 174. In this way, a strong collimation of light in and close to the direction of flight 40 may be achieved. The FAR requirements for forward navigation lights, as illustrated in FIG. 9, may be achieved in a particularly efficient manner.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft light for a foldable wing tip of an aircraft, the aircraft light comprising:
   a first lighting structure, comprising at least one first light source and a first optical system, with the at least one first light source and the first optical system in operation generating a first light output; and
   a second lighting structure, comprising at least one second light source and a second optical system, with the at least one second light source and the second optical system in operation generating a second light output;
   wherein the aircraft light is an aircraft navigation light, and the first light output is a first navigation light output and the second light output is a second navigation light output;
   wherein the first light output has the same color as the second light output and wherein the first light output and the second light output are angled with respect to each other such that the aircraft navigation light is able to provide lateral emission of a navigation light output, both when the foldable wing tip is in a folded up position and when the foldable wing tip is in a laterally extending position; and
   wherein the aircraft light is configured to control the at least one first light source and the at least one second light source depending on a wing tip orientation signal, which is indicative of an orientation of the foldable wing tip.

2. The aircraft light according to claim 1,
   wherein the first lighting structure comprises at least one third light source, with the at least one third light source and the first optical system in operation generating a third navigation light output,
   wherein the second lighting structure comprises at least one fourth light source, with the at least one fourth light source and the second optical system in operation generating a fourth navigation light output,
   wherein the third navigation light output and the fourth navigation light output are of the same color,
   wherein the color of the first navigation light output and the second navigation light output is one of green and red and wherein the color of the third navigation light output and the fourth navigation light output is the other one of green and red, and
   wherein the aircraft light is configured to control the at least one first light source, the at least one second light source, the at least one third light source, and the at least one fourth light source depending on the wing tip orientation signal.

3. The aircraft light according to claim 2,
   wherein the color of the first navigation light output and the second navigation light output is green and wherein the color of the third navigation light output and the fourth navigation light output is red,
   wherein the aircraft light is configured to turn on the at least one first light source, when the wing tip orientation signal indicates a folded up position of a right foldable wing tip,
   wherein the aircraft light is configured to turn on the at least one second light source, when the wing tip orientation signal indicates a laterally extended position of the right foldable wing tip, wherein the aircraft light is configured to turn on the at least one fourth light source, when the wing tip orientation signal indicates a folded up position of a left foldable wing tip, and wherein the aircraft light is configured to turn on the at least one third light source, when the wing tip orientation signal indicates a laterally extended position of the left foldable wing tip.

4. The aircraft light according to claim 3, configured to operate the at least one first light source and the at least one third light source and/or the at least one second light source and the at least one fourth light source in a flashing manner, when the wing tip orientation signal indicates a movement of the foldable wing tip between a folded up position and a laterally extended position.

5. The aircraft light according to claim 4, configured to operate the at least one first light source and the at least one third light source and/or the at least one second light source and the at least one fourth light source with a continuous light output in response to an aircraft parking signal.

6. The aircraft light according to claim 3, configured to operate the at least one first light source and the at least one third light source or the at least one second light source and the at least one fourth light source with a continuous light output in response to an aircraft parking signal.

7. The aircraft light according to claim 2, configured to operate the at least one first light source and the at least one third light source and/or the at least one second light source and the at least one fourth light source with a continuous light output in response to an aircraft parking signal.

8. The aircraft light according to claim 1, wherein the first light output and the second light output are angled between 60° and 120° with respect to each other.

9. The aircraft light according to claim 8, wherein the first light output and the second light output are angled between 75° and 105° with respect to each other.

10. The aircraft light according to claim 9, wherein the first light output and the second light output are angled 90° with respect to each other.

11. The aircraft light according to claim 1, configured to turn on the at least one first light source, when the wing tip orientation signal indicates a folded up position of the foldable wing tip.

12. The aircraft light according to claim 1, configured to turn on the at least one second light source, when the wing tip orientation signal indicates a laterally extended position of the foldable wing tip.

13. The aircraft light according to claim 1, configured to operate the at least one first light source and/or the at least one second light source in a flashing manner, when the wing tip orientation signal indicates a movement of the foldable wing tip between a folded up position and a laterally extended position.

14. The aircraft light according to claim 1, wherein the color of the first light output and the second light output is one of green and red.

15. The aircraft light according to claim 1, further comprising an orientation sensor, configured to detect an orientation of the aircraft light and to provide the wing tip orientation signal.

16. The aircraft light according to claim 1, further comprising an orientation signal input for receiving the wing tip orientation signal from outside of the aircraft light, such as from an aircraft board computer or from a pilot wing tip controller.

17. An aircraft comprising:
a fuselage;
a right wing, comprising a right main wing portion and a right foldable wing tip, wherein the right foldable wing tip is rotatable with respect to the right main wing portion;
a left wing, comprising a left main wing portion and a left foldable wing tip, wherein the left foldable wing tip is rotatable with respect to the left main wing portion;
a right aircraft light, arranged in the right foldable wing tip; and
a left aircraft light, arranged in the left foldable wing tip;
wherein each of the right aircraft light and the left aircraft light is an aircraft light according to claim 1.

18. A method of operating an aircraft light that is arranged on a foldable wing tip of an aircraft, wherein the aircraft light has a first lighting structure with at least one first light source and a first optical system, in operation generating a first light output, and a second lighting structure with at least one second light source and a second optical system, in operation generating a second light output, wherein the first light output has the same color as the second light output and wherein the first light output and the second light output are angled with respect to each other, the method comprising:
obtaining a wing tip orientation signal, which is indicative of an orientation of the foldable wing tip; and
controlling the at least one first light source and the at least one second light source depending on the wing tip orientation signal;
wherein the aircraft light is an aircraft navigation light, and the first light output is a first navigation light output and the second light output is a second navigation light output,
wherein the first light output and the second light output are angled with respect to each other such that the aircraft navigation light is able to provide lateral emission of a navigation light output, both when the foldable wing tip is in a folded up position and when the foldable wing tip is in a laterally extending position.

19. The method according to claim 18, wherein the step of controlling the at least one first light source and the at least one second light source comprises:
turning on the at least one first light source, when the wing tip orientation signal indicates a folded up position of the foldable wing tip; and
turning on the at least one second light source, when the wing tip orientation signal indicates a laterally extended position of the foldable wing tip.

* * * * *